US012113281B2

(12) United States Patent
Bastin

(10) Patent No.: US 12,113,281 B2
(45) Date of Patent: Oct. 8, 2024

(54) BROADBAND ANTENNA ASSEMBLY

(71) Applicant: Nantenna LLC, Melbourne, FL (US)

(72) Inventor: Gary L. Bastin, Palm Bay, FL (US)

(73) Assignee: Nantenna LLC, Melbourne, FL (US)

( * ) Notice: Subject to any disclaimer, the term of this patent is extended or adjusted under 35 U.S.C. 154(b) by 0 days.

(21) Appl. No.: 18/681,417

(22) PCT Filed: Aug. 8, 2022

(86) PCT No.: PCT/US2022/039713
§ 371 (c)(1),
(2) Date: Feb. 5, 2024

(87) PCT Pub. No.: WO2023/101729
PCT Pub. Date: Jun. 8, 2023

(65) Prior Publication Data

US 2024/0275070 A1 Aug. 15, 2024

Related U.S. Application Data

(60) Provisional application No. 63/230,093, filed on Aug. 6, 2021.

(51) Int. Cl.
*H01Q 1/48* (2006.01)
*H01Q 1/52* (2006.01)
(Continued)

(52) U.S. Cl.
CPC ........... *H01Q 19/108* (2013.01); *H01Q 9/285* (2013.01); *H01Q 15/006* (2013.01); *H01Q 19/185* (2013.01)

(58) Field of Classification Search
CPC .... H01Q 19/108; H01Q 9/285; H01Q 15/006; H01Q 19/185
See application file for complete search history.

(56) References Cited

U.S. PATENT DOCUMENTS 3,990,024 A 11/1976 Hou
5,986,609 A * 11/1999 Spall ...................... H01Q 9/285 343/702
(Continued)

FOREIGN PATENT DOCUMENTS

EP 3633789 A1 4/2020
WO 2004066441 A1 8/2004
WO 2016144155 A1 9/2016

OTHER PUBLICATIONS

Altunyurt, Nevin et al., "Antenna Miniaturization Using Magneto-Dielectric Substrates", IEEE 2009 Electronic Components and Technology Conference, pp. 801-808.
(Continued)

*Primary Examiner* — Hai V Tran
*Assistant Examiner* — Michael M Bouizza
(74) *Attorney, Agent, or Firm* — Howard & Howard Attorneys PLLC

(57) ABSTRACT

The teachings of the present application generally for an ultra-high frequency (UHF) antenna assembly which provides for a smaller package size with the same or better efficiency as a much larger antenna, particularly between 100 MHz to 500 MHZ. Particularly, through the combination of components and structures for implementing frequency selective surfaces (FSS) and high impedance structures (HIS) in combination with an anisotropic magneto-dielectric material, the present teachings provide for the use of both lower and higher frequency techniques through the operational frequency band and miniaturization, accurately improving the performance of UHF satellite communication antennas. Specifically improving performance in narrow-band, with increases in efficiency, bandwidth, and lowered elevation angle radiation characteristics.

20 Claims, 19 Drawing Sheets

(51) Int. Cl.

| | |
|---|---|
| ***H01Q 9/28*** | (2006.01) |
| ***H01Q 9/42*** | (2006.01) |
| ***H01Q 15/00*** | (2006.01) |
| ***H01Q 19/10*** | (2006.01) |
| ***H01Q 19/185*** | (2006.01) |

(56) References Cited

U.S. PATENT DOCUMENTS

| | | | |
|---|---|---|---|
| 6,181,281 B1 | 1/2001 | Desclos et al. | |
| 7,042,403 B2 | 5/2006 | Colburn et al. | |
| 7,183,978 B1 | 2/2007 | Azar | |
| 7,253,770 B2 | 8/2007 | Yegin et al. | |
| 8,228,251 B1 | 7/2012 | Behdad et al. | |
| 8,773,312 B1 | 7/2014 | Diaz | |
| 9,596,755 B2 | 3/2017 | Sethumadhavan et al. | |
| 10,862,198 B2 | 12/2020 | Guthrie et al. | |
| 10,938,120 B2 | 3/2021 | Rogers et al. | |
| 2002/0024472 A1 | 2/2002 | Thursby et al. | |
| 2012/0146881 A1 | 6/2012 | McKinzie, III | |
| 2012/0162021 A1 | 6/2012 | Lee et al. | |
| 2016/0141085 A1* | 5/2016 | Heino | H01Q 9/0407 427/598 |
| 2019/0140348 A1* | 5/2019 | Jafargholi | H01Q 1/245 |
| 2020/0099122 A1 | 3/2020 | Rogers et al. | |

OTHER PUBLICATIONS

Bastin, Gary L., “Photonic Bandgap (PBG) Shielding Technology”, Space and Missile Defense Conference, Huntsville, AL, Aug. 13-16, 2007, 2 pages.

Eldamak, A.R. et al., “Implementation of Printed Small Size Dual Frequency Antenna in MHz Range”, International Journal of Electronics and Telecommunications, 2019, vol. 65, No. 4, pp. 565-570.

Ermutlu, M.E. et al., “Patch Antennas With New Artificial Magnetic Layers”, Apr. 2005, 8 pages.

English language abstract for WO 2004/066441 A1 extracted from espacenet.com database on Jan. 27, 2022, 2 pages.

Zakaria, Z. et al., “A Parametric Study on Dual-Band Meander Line Monopole Antenna For RF Energy Harvesting”, 2013 IEEE International Conference on RFID Technologies and Applications, 5 Pages.

* cited by examiner

Fig-5
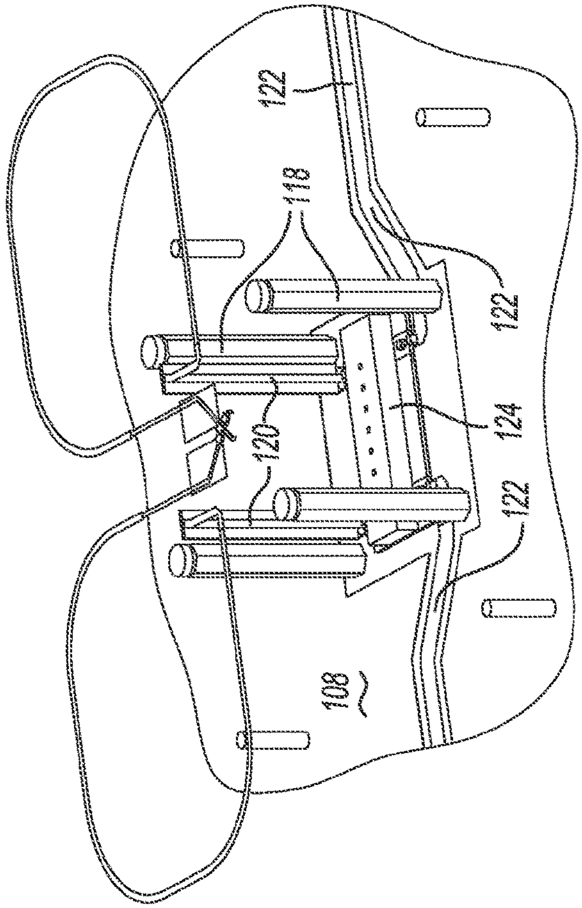
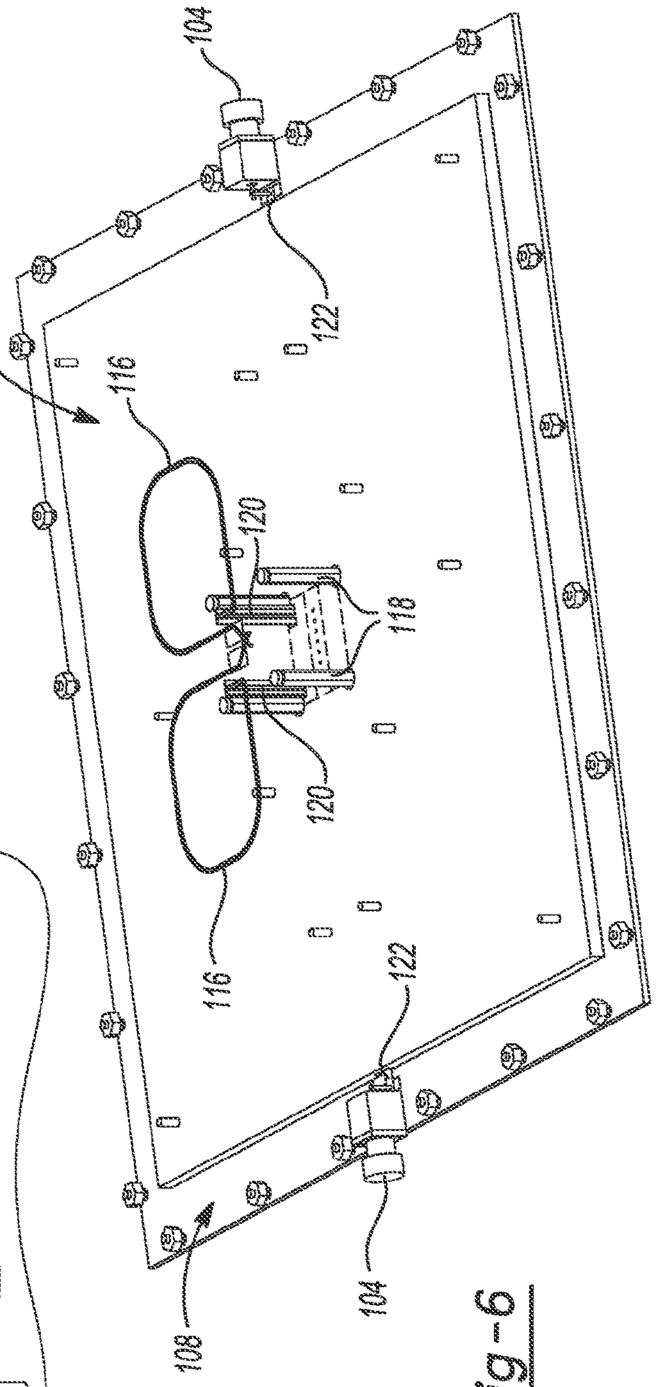
Fig-6

BROADBAND ANTENNA ASSEMBLY

PRIORITY CLAIM

This application claims priority to and all the benefits of United States Provisional Patent Application No. 63/230,093, filed Aug. 6, 2021, the entire contents of which are hereby incorporate by reference.

REFERENCE TO GOVERNMENT RIGHTS

This invention was made with United States government support under Contract number FX203-CSO1-2664 awarded by the United States Air Force. The United States government has certain rights in the invention.

TECHNICAL FIELD

The general teachings of the present application relate to systems and methods relating to the miniaturization of Ultrahigh Frequency antennas.

BACKGROUND

In the field of mobile communication, particularly satellite communications, various types of low-profile patch antennas have been extensively used because of their advantage of compactness, which are equipped with a plate-shaped dielectric substrate and a conductor patch formed on the surface of the substrate.

Varied types of small antennas, low profile antennas or microstrip antennas have been developed to address critical requirements such as improved circular polarization, improved low angle radiation pattern, widen beams, enhanced gain at low angle, dual band operation etc. Such antennas have been developed by using slotted radiating patch, high dielectric material substrate, artificial magnetic conductor, electromagnetic bandgap structure, metamaterial, and magnetodielectric materials etc.

Typically, in circularly polarized antennas, the structure of a patch antenna is frequently used. A patch antenna having a half wavelength size has a narrow beam width of about 70 degrees. To increase the bandwidth of the patch antenna, the size of the patch is reduced so as to be still smaller than the half wavelength using a high-k substrate, or a ground plane having a three-dimensional structure such as a pyramid is used. However, when the size of the patch is reduced, the return loss bandwidth of the antenna is reduced. When the ground plane having a three-dimensional structure is used, the thickness of the antenna is increased.

Miniature antennas have number of merits in terms of size, efficiency, and compatibility. Relatively small antennas have trade-offs such as efficiency sensitive to magnetic loss and bandwidth narrower than other cases. However, the need for a miniaturized antenna with improved bandwidth, gain, efficiency, or a combination thereof still exists.

Accordingly, there remains a need to have an expansion of usable frequency bandwidths of miniaturized antennas without increasing sizes of radiating element(s). There is a need for allowing the use of both lower and higher frequency techniques at 220 MHz to 380 MHz frequency range where such techniques have previously been impossible.

As mentioned above, a target frequency of sending and/or receiving radio waves below 500 MHz with a miniaturized antenna may be desired. To either generate or to receive such a wave and simultaneously achieve sufficiently wide bandwidths, a physical structure electrically that is large enough, comparable to a wavelength, is required. The wavelength, λ, in meters, existing in free space for any given electromagnetic radiating and propagating wave at any given frequency is given by:

$$\lambda_{meters} = \frac{300}{f_{MHz}}$$

The physical structure may be smaller than the physical dimensions of the propagating wave while traveling in free space. A common antenna structure that meets these requirements is a half wave dipole. In the case of a half-wave dipole, the dimension is approximately 95% of the half wavelength as measured in free space. The reason for this being different than half of the propagating wavelength is that a capacitive end-effect, occurring at the tips of the half-wave dipole, imparts an electrical lengthening of the antenna's electrical length, making the antenna electrically longer than its physical length. Hence, to tune such an antenna to resonance, shortening the antenna to approximately 95% of the true half-wavelength as measured in free space becomes necessary. The electrical length of the antenna approaches the true half wavelength relative to the electrical length, and the antenna becomes resonant, able to transmit and receive electromagnetic energy efficiently.

The physical length for such an antenna, as a function of wavelength, becomes:

$$l = x/\lambda \text{ and } x \cong \frac{0.95}{2}$$

This is the approximate physical length or size of a common resonant antenna in free space. Such an antennas provides moderate bandwidth and exhibits high efficiency. However, such an antenna may be too large physically for many applications. By miniaturizing such an antenna, while still maintaining both efficiency and bandwidth, and extending the bandwidth of the antenna relative to the simple half-wave dipole antenna structure is desired.

SUMMARY

The teachings of the present application generally provide a solution to one or more of the aforementioned needs by providing for an ultra-high frequency (UHF) antenna assembly which provides for a smaller package size with the same or better efficiency as a much larger antenna, particularly between an operational frequency band of 100 MHz to 500 MHz. Particularly, through the combination of components and structures for implementing frequency selective surfaces (FSS) and high impedance structures (HIS) in combination with an anisotropic magneto-dielectric material, the present teachings provide for the use of both lower and higher frequency techniques through the operational frequency band and miniaturization, accurately improving the performance of UHF satellite communication antennas. Specifically improving performance in narrowband, with increases in efficiency, bandwidth, and lowered elevation angle radiation characteristics.

The teachings generally provide for an antenna assembly comprising a substrate layer having a first dielectric material and a composite layer spaced apart from the substrate layer, the composite layer including a first radiating element and a second radiating element on a top surface of the composite layer, a ground plane forming a bottom surface of the composite layer, and a second dielectric material between the first radiating element and the second radiating element and the ground plane. In some examples, the first dielectric material is an anisotropic magneto dielectric material. In some examples, the first radiating element and the second radiating element each include a transmission line folded into a stepped meander line, the stepped meander line extending between a first location and a second location along the top surface. In some examples, the stepped meander line includes a plurality of steps, each of the plurality of steps including a first elongated section and a second elongated section connected by a transition segment, each of the transition segments are arranged on alternating outer edges of the stepped meander line with each of the transition segments being parallel to one another.

In some examples and configures, it is contemplated the first radiating element and the second radiating element may have an exponential parametric shape having a taper between the first location and the second location on the composite layer. In some examples, the outer edges of the stepped meander line have the exponential parametric shape. It is further contemplated that each transition segment may include a notch between each of the elongated sections. Each of the first elongated sections and each of the second elongated sections may have a first end and a second end may have a profile corresponding to the exponential parametric shape, the notch of the transition segments proximally extending in from first elongated section toward the second elongated section while the angled profile of first elongated section and the second elongated section remain parallel. The plurality of steps of the radiating element may progressively extend in expanse between the first location and the second location on the composite layer, such that the first elongated section has a shorter length than the second elongated section, and the second elongated section has a shorter length than a third elongated section. The elongated sections may each have a self-resonance frequency which cancels a radiated transmission of each corresponding elongated section, and wherein the plurality of transition segments each radiate energy parallel along the parametric shape. The transmission line of the first radiating element may have an equal length to the transmission line of the second radiating element, and the first radiating element may be congruent with the second radiating element. The bottom surface of the composite layer may define a plurality of bandgaps, the plurality of bandgaps may be defined by the ground plane include at least one first bandgap and at least one second bandgap. The at least one first bandgap may inhibit circulating ground currents at a first frequency range, and the at least one second bandgap may inhibit circulating ground currents at a second frequency range. The at least one first bandgap and the at least one second bandgap may form a high impedance structure in the ground plane throughout an operational frequency band, causing the ground plane to be a frequency selective surface, reducing loss of radiation by decreasing circulating ground currents at the first frequency range and the second frequency range. The first bandgap may be a defected bandgap that reduces fall off of the first frequency range by 20 percent to 50 percent, and each of the second bandgaps may be photonic bandgaps configured to reduces fall off of the second frequency range by 20 percent to 50 percent. The antenna assembly may have an operational frequency of 100-500 MHz. The first frequency range may overlap with the second frequency range. The substrate layer may be spaced apart from the ground plane by a distance. The first radiating element and the second radiating element may be arranged on the composite layer such that the second radiating element is orthogonal to the first radiating element forming an electrical phase shift of 90 degrees, increasing circular polarization. The exponential parametric taper of the first radiating element and the second radiating element may reduce transmission speed of energy while widening the operational frequency band working in conjunction with the at least one first bandgap and the at least one second bandgaps which may electromagnetically decouple the first radiating element and the second radiating element with respect to each other throughout the operational frequency band, providing the antenna assembly with a physically small size relative to the operational frequency band.

BRIEF DESCRIPTION OF THE DRAWINGS

Advantages of the present disclosure will be readily appreciated as the same becomes better understood by reference to the following detailed description when considered in connection with the accompanying drawings.

FIG. 5 is an enlarged view of the base layer of the antenna assembly showing a splitter and microstrips leading to a pair of radiating elements.

FIG. 6 is a schematic view of a substrate layer with the microstrips leading to a pair of radiating elements.

DETAILED DESCRIPTION

Figure 1:
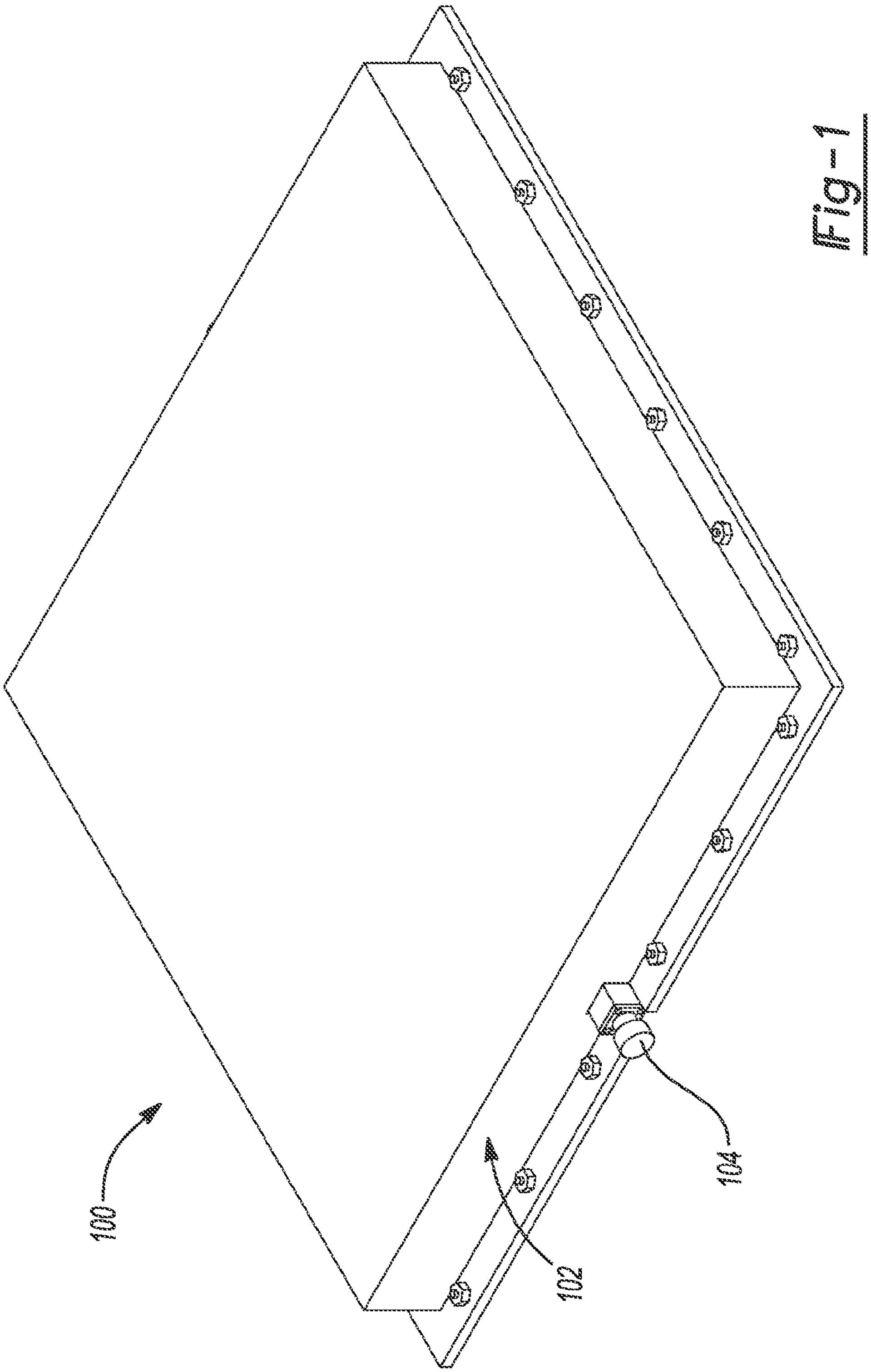
FIG. 1 is a perspective view of a broadband antenna assembly.

Several examples have been discussed in the foregoing description. However, the examples discussed herein are not intended to be exhaustive or limit the invention to any particular form. The terminology that has been used is intended to be in the nature of words of description rather than of limitation. Many modifications and variations are possible in light of the above teachings and the invention may be practiced otherwise than as specifically described.

The present teachings pertain to an antenna assembly 100 which is physically smaller while providing the same or greater performance over a wide frequency range. The antenna is "miniaturized" by utilizing selective materials and arrangements which provide for miniaturization and broadband capabilities. The antenna assembly 100 is arranged as an antenna stack 106 including a base layer 108, a substrate layer 110 comprising an anisotropic magneto-dielectric material, and a composite layer 112 including a ground plane 114 and one or more radiating elements 116. The antenna assembly may be configured for satellite communications in the ultra-high frequency (UHF) range. It is contemplated the present teachings may be applied to different frequencies and ranges. In some examples, the antenna assembly operates at a range of 100 MHz to 500 MHz.

The present teachings generally provide for miniaturizing the size of an antenna using techniques that utilize the presence of the effects of magneto-dielectric materials having permittivity value and permeability value that are larger than the permittivity value and permeability value of free space. By incorporating selective materials, such as magneto-dielectric material, the size of the antenna assembly 100 shrinks in physical length and/or size. The magneto-dielectric material may be placed everywhere around such the antenna stack 106 (e.g., by potting the antenna stack 106 physically with the material), or placing a sheet of printed wiring material made of the magneto-dielectric material in the near-field of the radiating elements 116 of the antenna assembly 100, providing a shrinking effect on the size of the antenna assembly 100 to a set of dimensions meeting the degree of miniaturization that is desired.

The degree of miniaturization of a given antenna assembly 100 is increased by placing a volume of a magneto-dielectric material in the near-field of the composite layer 112 of the antenna stack 106 for miniaturization. The magneto-dielectric material, comprising one or more portions of the substrate layer 110 with the base 108 of the antenna stack 106 may extend beyond the dimensions of the composite layer 112, referred to as the composite layer, to prevent wrap-around of fringing electromagnetic fields from occurring through space around the composite layer 112 of the antenna stack 106 in which there is no magneto-dielectric material. In some examples, extending the planar magneto-dielectric material of the substrate layer 110 beyond the planar extent of the composite layer 112 by about 20 percent to 40 percent larger than the planar area occupied by the composite layer 112 is sufficient to achieve miniaturizing the antenna assembly 100. In some examples, the distance of the magneto-dielectric material relative to the radiating elements 116 of the antenna stack 106 may have the same performance and miniaturization characteristics as long as the magneto-dielectric material is within the near field of the radiating elements 116. In some examples, the radiating elements 116 are enveloped in the magneto-dielectric material, encapsulating a portion or the entire antenna assembly 100, also known as "potting" the radiating elements, providing the same miniaturizing effect as placing magneto-dielectric material within the near-field of the radiating elements 116.

The determination of the appropriate amount of magneto-dielectric material may be accomplished by placing varying thicknesses of magneto-dielectric materials in the near field of antenna structure and observing when the degree of antenna miniaturization has no further miniaturization effect when the thicknesses and expanses of magneto-dielectric material is increased.

Such use of magneto-dielectric material allows the use of a minimal amount of the magneto-dielectric material necessary for accomplishing antenna miniaturization, and allows the use of standard antenna manufacturing techniques, with the magneto-dielectric material being a sheet of material with appropriate properties.

The physical miniaturization, or shrinking, of an antenna assembly 100 is dependent on the electrical length of the antenna. The electrical length of such a dimension or length of an antenna, is dependent on the actual physical length, l, of the antenna structure multiplied by the effective propagation constant of the media, β, in which this physical dimension or length device is placed, whether being completely enveloped in a single medium, or when placed in close proximity to such a medium, or when placed in proximity to multiple media of which all have or exhibit appropriate magnetic and electrical properties. In the present example, an anisotropic magneto dielectric material is used in the substrate layer 110, which is described further below.

The propagation constant acts like a scaling factor, increasing the electrical dimensions of the antenna assembly 100, thereby reducing the resonant frequency of the antenna. To maintain operational capability at a given frequency, the physical size of the antenna assembly 100 therefore has to be reduced by an equivalent inverse multiplicative factor. This effect enables physical miniaturization of the antenna. The derivation of the physical size reduction equation follows.

The propagation constant beta, B, is dependent on the wavelength, λ, as well as the permittivity, ¿, and the permeability, u. The permittivity, ¿, is given by the product of the permittivity of free space multiplied by the relative permittivity of the medium in which the antenna is placed. The permeability, u, is given by the product of the permeability of free space multiplied by the relative permeability of the medium in which the antenna placed. The relative permittivity and relative permeability of the magneto-dielectric material are therefore what determine the degree of miniaturization that can be achieved.

Hence, to achieve a given fixed electrical length, which is what matters when tuning an antenna to resonance, thereby enabling an antenna to radiate and receive electromagnetic energy efficiently, when such an antenna is placed in close proximity to or is enveloped in or is placed in close proximity near a magneto-dielectric material having both high relative permittivity and high permeability, the physical length must be reduced in size by one over the product of the square root of the relativity permittivity multiplied by the square root of relative permeability, to maintain the same resonant electrical length dimensions.

Specifically, the miniaturized antenna size becomes reduced by:

$$l_{miniatureized\ antenna} = \frac{l}{\sqrt{\epsilon_r \mu_r}}$$

to maintain the same electrical length of the miniaturized antenna, for $$\text{Length}_{Electrical} = \beta * l_{miniaturized\ antenna} = \beta * \frac{l}{\sqrt{\epsilon_r \mu_r}}$$

to still tune the miniaturized antenna to resonance. Hence, the use of magneto-dielectric materials enables shrinking the physical sizes of resonant physical structures capable of radiating and receiving an electromagnetic signal efficiently. In contrast, a typical miniature satellite communications antenna, occupying the same planar area as the current teachings provide but without a magneto-dielectric substrate layer being employed, does not allow for more than one resonance of approximately 12 MHz in width over the entire 100-500 MHz bandwidth, which may be sufficient to "close" a satellite link, but is such a narrowband antenna precluding the use of all available channels in such a satellite communication link.

The present teachings provide for the usage of the majority of the possible channels provided by a broadband satellite communications system between 100-500 MHz bandwidth, increasing total data throughput and likewise increasing the total number of simultaneous users that can exploit such a satellite communications system. In some examples, the antenna assembly 100 may have an operating range 100-500 MHz. In other examples, the antenna assembly 100 may have an operating range 200-400 MHz. The present teachings provide significant performance enhancements over prior miniature satellite communications (SATCOM) antennas.

Turning to FIG. 1, illustrates a perspective view of a low-profile antenna assembly 100. The antenna assembly 100 includes a radome 102 which covers the antenna stack 106 without affecting performance of the antenna during operation. The radome 102 is constructed of materials that are free of deleterious permittivity losses, permeability losses, and hygroscopic water-holding absorptive loss properties, ensuring that the radome does not interfere with the electrical properties of the antenna stack. Input feed connectors 104 are disposed through the radome 102 into the antenna stack 106.

Figure 2:
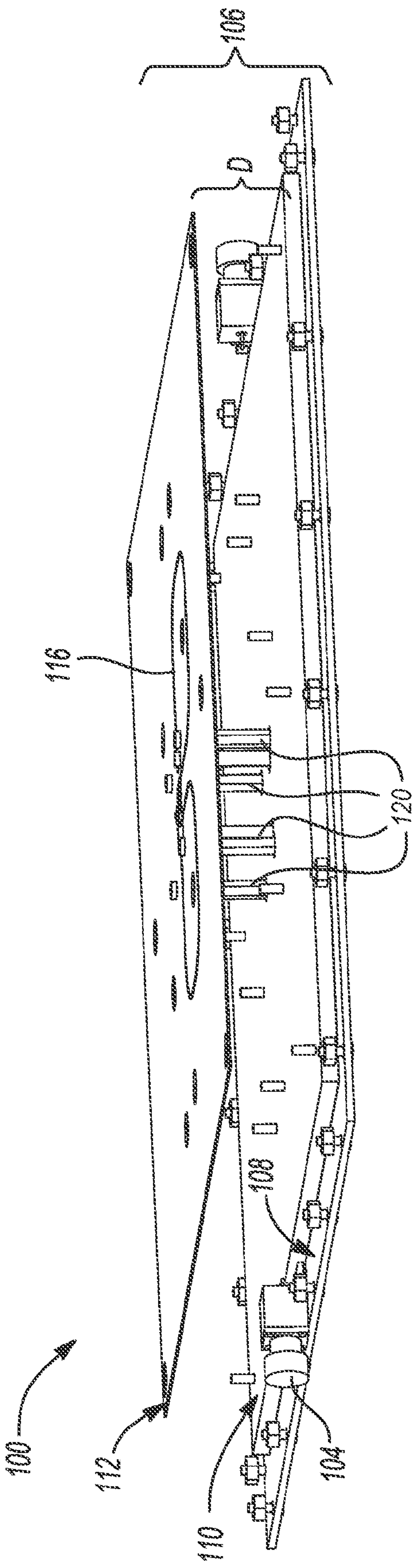
FIG. 2 is a perspective view of the antenna assembly.
Figure 3:
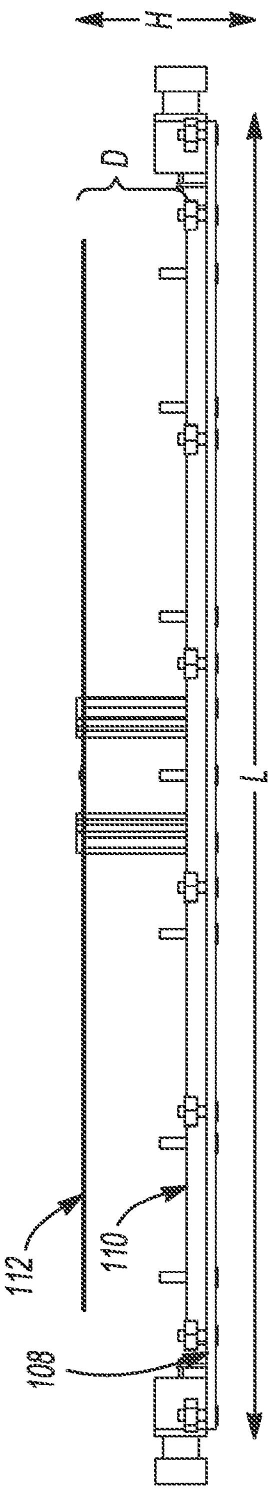
FIG. 3 is a side view of the antenna assembly.

Turning to FIGS. 2 and 3, a schematic arrangement of the antenna assembly 100 is shown. The top portion is the composite layer 112, which rests on posts 118, spacing the composite layer 112 apart from the substrate layer 110. The substrate layer 110 is disposed on top of and in communication with the base layer 108.

Figure 4:
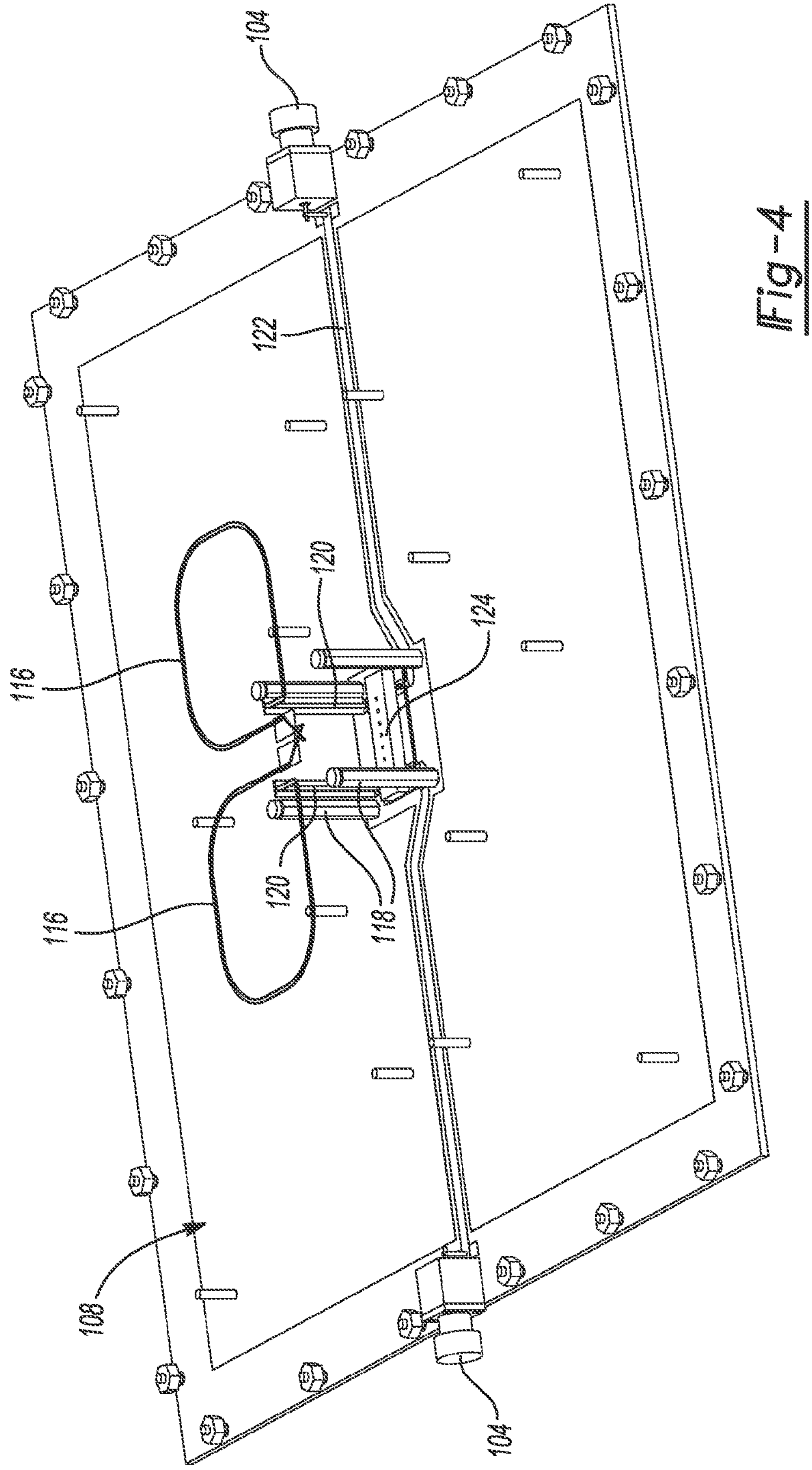
FIG. 4 is a schematic view of the base layer of the antenna assembly.

As seen in FIG. 4, the base layer 108 of the antenna assembly 100 is a printed wiring board layer (also referred to as PWB). The base layer 108 may be formed from a dielectric material. In some examples Kappa 438, available from Rogers Corporation in Chandler, Arizona, may be used as the base layer material, however other dielectric materials are contemplated. The base layer 108 may function as the mounting location for input microstrips 122 and the splitter 124. The input feed connectors 104 are each connected with microstrips 122, respectively, which both connect to splitter 124. Each of the microstrips 122 run along a centerline of the base layer 108 to the splitter 124 in the center of the base layer 108.

The antenna includes a splitter. In the present examples, the splitter 124 is a 90-degree hybrid splitter which sends power through the antenna stack 106. The 90-degree hybrid splitter 124 includes at least two outputs, a 0-degree output and a 90-degree output to provide two waves which are 90 degrees out of phase with each other. The splitter 124 is connected with output microstrips 120 and ran through slots in the substrate layer 110 to the composite layer 112, connecting to the radiating elements 116 (described further below). Each of the output microstrips 120 connected with a respective radiating element 116 for the right-hand circular polarization (RHCP) and left-hand circular polarization (LHCP).

FIG. 5 shows the output microstrips 120 connecting to the radiating elements 116 in a magnified schematic view. The output microstrips 120 are transmission lines that carry the RF powers upward from the splitter 124 to the two radiating elements 116. The posts 118 are aluminum standoffs that support the composite layer 112 on which the radiating dipole elements 116 are connected as a metallization layer on the top metallization layer of the composite layer 112.

FIG. 6 illustrates the substrate layer 110. The substrate layer 110 may be made from one or more composite materials. In some examples, the one or more composite materials possess controlled permeability and permittivity that are intended for use in as radio frequency (RF) materials, primarily in antenna applications where the material allows for substrate impedance match to free space. The substrate layer 110 may be made from one or more materials which is made of high temperature thermoplastic composites, intended for use at frequencies up to five hundred mega-hertz (500 MHz). The substrate layer 110 material assists in antenna miniaturization below 500 MHz, where antennas are traditionally large due to their wavelength. The substrate layer 110 may exhibit stable electrical properties with frequency and modify effective permeability and permittivity to control effective substrate properties, change relative volume of dielectric and magneto-dielectric materials.

In the present example, the one or more substrate layers 110 may be comprised of an anisotropic magneto-dielectric material that has less loss and a wider bandwidth than a high dielectric material with performance over temperature. The substrate layer 110 is sized with a thickness to give λ/4 spacing at low end of frequency (e.g., between 100-500 MHZ), maximizing thickness of material across the entire antenna, and gives the highest gain at the low end of the band. The anisotropic magneto-dielectric material assists in "shrinking" the sizes of physical dimensions of the antenna assembly 100, particularly the radiating elements, the bandgaps formed in the ground plane, and the physical length offset from the composite layer 112. In some examples, Magtrex 555, available from Rogers Corporation in Chandler, Arizona, may be used as the substrate layer 110. Put another way, in addition to contributing to shrinking the length and width of the antenna assembly 100, the anisotropic magneto-dielectric material allows the reduction of the distance D required between the composite layer 112 and the substrate layer 110, shortening the electrical height of the antenna assembly 100. In some examples, the distance D between the composite layer 112 and the substrate layer 110 corresponds with the nearfield of the target range the antenna assembly 100 is designed to operate within, such as between about $1/10^{th}$ to about $1/16^{th}$ of the size of the wavelength. In one example, at 300 Mhz, the wavelength is approximately 1 meter resulting in an example distance D between 5 centimeters and 10 centimeters. Other frequency wavelengths and distances D between the composite layer 112 and the substrate layer 110 are contemplated. The higher the electrical height, the lower the angle of radiation will be towards the horizon for a given antenna, as needed to provide an improved hemispheric antenna pattern, such as for communicating with satellites that appear to be close to the horizon. The contents of U.S. Pat. No. 9,596,755B2 are incorporated by reference.

Figure 7:
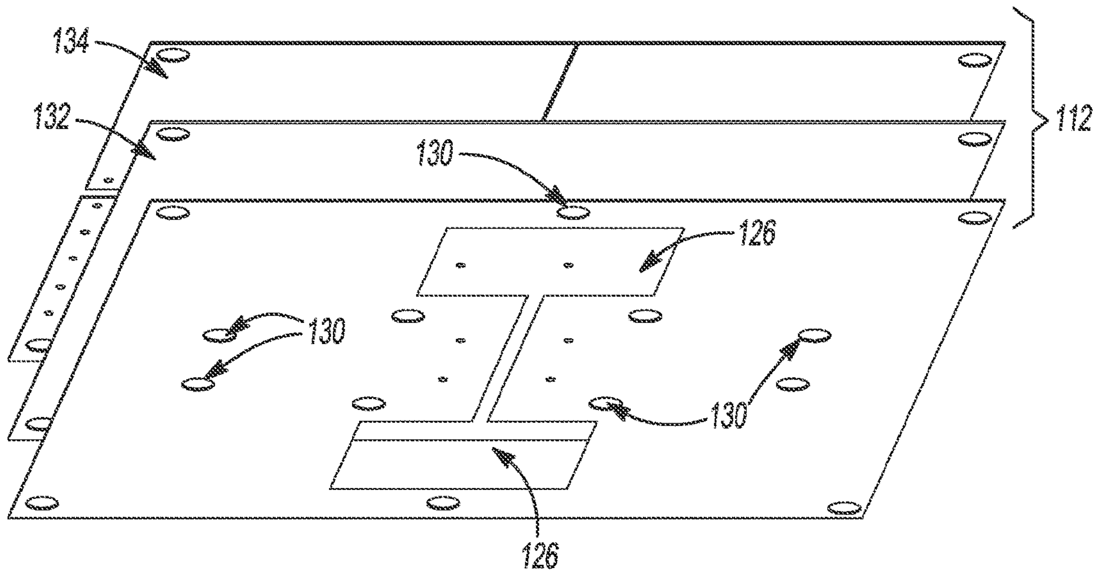
FIG. 7 is a bottom perspective exploded view of a composite layer.
Figure 8:
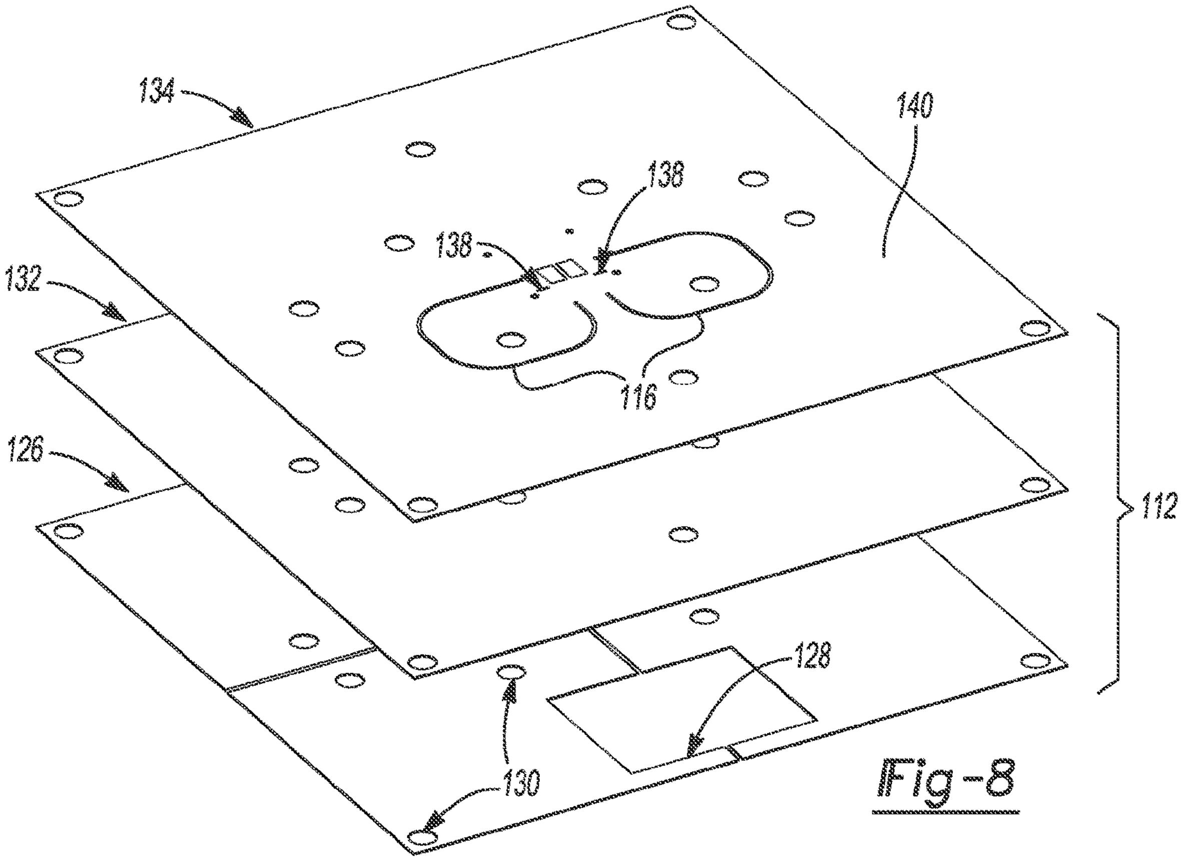
FIG. 8 is a top perspective exploded view of the composite layer.

The output microstrips 120 and posts 118 pass through one or more substrate layers 110 to the composite layer 112. As seen in FIGS. 7 and 8, the composite layer 112 is comprised of a top surface 134, an intermediate material 132, and a bottom surface 126. The composite layer 112 has a smaller dimension than the substrate layer 110. The composite layer 112 is secured to posts 118 with fasteners. The composite layer 112, also referred to as a laminate layer, may also be known as the radiating board, top board, or similar. As described further below, the top surface 134 and the bottom surface 126 may be printed onto the intermediate material 132. In some examples, the top surface 134 and the bottom surface 126 may be copper and other metals which are selectively applied to the intermediate material to form performance-enhancing shapes, such as the radiating elements 116, defected bandgaps 128, photonic bandgaps 130, grounds, and the like.

The bottom surface 126 of the composite layer 112 is a ground plane. In FIG. 7, the ground plane 126 of the composite layer 112 is shown schematically. As best seen in FIG. 7 and FIG. 8, the ground plane 126 defines a defected bandgap (DBG) 128 having a first end and a second end, the first end at least partially disposed under and overlapping the two radiating elements, and the second end positioned opposite the radiating elements. The ground plane 126 contains an aperture shaped as a modified H-shaped and/or "dumbbell" shaped DBG structure 128. However, other shapes and sizes of the DBG 128 are contemplated. The DBG 128 is a portion of the ground plane formed as a patterned void that transforms the ground plane 126 into a high impedance structure (H.I.S.) at a select frequency range. The DBG 128 may eliminate the presence of any circulating ground currents that would otherwise flow in this ground plane layer 126 when in the presence of radiated fields generated by the radiating elements 116 located above this ground, separated by the presence of the intermediate material 132 (i.e., a dielectric layer that is sandwiched between the ground plane 126 structure and the top plane 134 which is a radiating element 116 upper metallization layer). In some examples, the DBG 128 as shown throughout FIGS. 7 and 8 may prevent circulating ground currents between 220 MHz and 300 MHz.

To determine the appropriate size and shape of the defected bandgap (DBG) 128 for the target operating frequency range of the antenna assembly 100, the size of the antenna must be determined and subsequently scaled down, as described above. To scale the antenna, the antenna element is sized based on the free space wavelength apart from an anisotropic magneto-dielectric material. The antenna element is then scaled down based on the square root of dielectric constant of the permittivity constant ($E_r$) multiplied by the square root of permeability constant ($M_r$) of the selected anisotropic magneto-dielectric material. Once the antenna element is sized based on the substrate layer material (e.g., Magtrex 555), the size of the DBG 128 is calculated.

The DBG 128 is designed relative to the function of frequency with a 50-ohm transmission line at the frequency of interest. The transmission line is on the top surface, being fed with power, and DBG 128 on the bottom surface. In some examples, the size of the ground plane beneath the microstrip line is adjusted until the loss of the microstrip increases by about 1 dB to about 10 dB. In some examples, the size of the ground plane beneath the microstrip line is adjusted until the loss of the microstrip increases by about 1 dB to about 2 dB. The dimensions of the DBG are designed to accommodate the target frequency. In some examples, the resonance frequency is 1.1 to 1.4 over the target operating frequency. The band edge of the loss is adjusted downward by increasing the size of the DBG 128, reducing the cut-off frequency of the ground plane by a factor of about 20 percent to about 50 percent relative to the lowest frequency and highest frequency, respectively, until the loss is reduced to about 0.1 dB to about 0.5 dB within the desired passband. In some examples, the defected bandgap 128 reduces fall off of the frequency by 20 percent to 50 percent in a particular range. The dimensions of the DBG 128 are adjusted as not to impact the insertion loss of the microstrip line at the desired frequency range. In some examples, the DBG 128 is scaled about 1.2 to about 1.5 times over the target frequency range and then adjusted to be resonant above about 20 percent to about 50 percent above the target frequencies/bandwidth of the target operation of the antenna. In other words, the size of the DBG 128 is scaled larger by a factor of about 1.2 to about 1.5, reducing the frequencies over which the ground plane 126 is converted from a conductor into a semi-conductor.

The ground plane 126 further includes circular holes in the ground plane 126, which introduces a plurality of photonic bandgap (PBG) structures 130, a more general form of a DBG, which provides the advantage of a DBG at higher frequencies than the dumbbell DBG 128 provides in this example. A PBG 130 is a portion of the ground plane formed as a plurality of patterned voids that transforms the ground plane 126 into a high impedance structure (H.I.S.) at a select frequency range. In some examples, such as shown in FIGS. 7 and 8, the PBG 130 may prevent circulating ground currents between 300 MHz and 380 MHZ. Together, the DBG 128 and the PBG 130 circular cutout structures in the same physical ground plane 126 provide the benefits of a defected bandgap operating over the lower frequencies as provided by the DBG shape 128 and over the higher frequencies as provided by the PBG circular shape 130 defects placed into the ground plane 126.

Similar to the DBG 128, the PBG 130 is designed relative to the function of frequency. The PBG 130 is adjusted based on the frequency range of interest. The PBG 130 is placed in the ground plane 126 with a series of small circular holes forming the photonic bandgap ground 130. In some examples, the circular holes forming the PBG 130 are increased in size such that the microstrip loss is increased by about 1 dB to about 10 db. In some other examples, the circular holes forming the PBG 130 are increased in size such that the microstrip loss is increased by, about 1 dB to about 2 dB within the desired passband. The size of PBG 130 is reduced by a factor of about 1.2 to about 1.5, which increases the frequencies over which the PBG 130 electrically decouples the ground plane, reducing the loss through the microstrip line to about 0.1 dB to about 0.5 dB.

By scaling the DBG 128 and PBG 130, the semiconductor region over the entire desired operating frequency region is increased for which the miniaturized antenna is to be operated. By scaling the entire DBG 128 by an increase of about 1.2 to about 1.5 the higher the impedance the ground plane frequencies below the desired operating passband relating to the DBG 128 shape. By scaling the PBGs by a reduction of about 1.2 to about 1.5, the higher impedance the ground plane frequencies above the desired operating passband relating to the PBG 130 shape. In some examples, the PBGs 130 reduce fall off of the frequency by 20 percent to 50 percent in a particular range. The portions of the ground plane 126 that are not removed to form the DBG 128 and PBG 130 is a semiconductor region over the entire desired operating frequency region for which the miniaturized antenna is to be operated.

The location of the DBG dumbbell shape 128 provides a high impedance structure (H.I.S) in just the DBG ground, which is what isolates and prevents coupling through the bottom ground plane 126 from occurring between the two ends of the radiating elements 116. As seen in FIGS. 7 and 8, the DBG 128 includes a first end and a second end, the first end at least partially disposed under and overlapping the radiating elements and the second end is positioned opposite the radiating elements. By removing this coupling between the two ends of the dipole radiating elements 116 in the ground plane 126 beneath them, this in turn enables increasing the bandwidth of the antenna assembly 100 as a whole. In some examples, when the radiating elements are electrically coupled through 3-D space as well as through the 2-D ground plane beneath them in a traditional, larger implementation of an antenna, the increased coupling between the two radiating elements of the dipole results in decreasing the operating bandwidth of the radiating elements as the antenna size is shrunk. By reducing the coupling through the ground plane 126 by the insertion of the DBG 128 and PBG 130 ground plane structures, this introduces a H.I.S., and the normally conductive ground plane becomes analogous to an artificial dielectric or a metallic semiconductor, as a function of operating frequency. In the present example, a normally conductive ground plane is converted into a semiconductor that, despite being made of metal, becomes a very poor conductor only over the frequencies of interest (e.g., 100 MHz-500 MHz). Outside the frequencies of interest, the metal reverts to being a normal conductive layer. This DBG structure 128 creates a unique frequency selective surface (F.S.S.) that remains a good conductor outside the frequencies over which the DBG 128 and PBG 130 shapes are designed to control the conductivity of the bottom ground plane layer 126, while making the metallic portion a semiconductor over the desired frequencies of interest. Although the present disclosure provides for an operational frequency range of 100-500 MHz, other frequency ranges are contemplated.

The DBG 128 and PBG 130 shapes also improve the efficiency of the antenna assembly 100 as a whole by reducing the magnitudes of circulating ground currents beneath the radiating elements 116 that cause small antennas to be inefficient, by causing conversion of the power of the circulating currents into heat, rather than increasing the amount of energy that is radiated by the radiating elements 116.

As seen in FIGS. 7-8, the intermediate material 132 is shown in the composite layer 112. The intermediate material 132 may be a dielectric material that is sandwiched between the top plane 134 and the bottom ground plane 126 in the composite layer 112. In some examples, Rogers RO4534 dielectric material, available from Rogers Corporation of Chandler, Arizona, may be used as the dielectric intermediate material in the composite layer 112.

The presence of the anisotropic magneto-dielectric material, coupled with the DBG 128/PBG 130 structure, combines to cause a reduction in the size of the radiating elements 116 to achieve a given performance in terms of implementation into a smaller physical volume, and a smaller physical area, simultaneously providing useful operation over a wider bandwidth, all simultaneously, which allows achieving an improvement in the radiation efficiency of a small antenna. The result is a miniaturized antenna that performs much like a traditional antenna occupying a much larger size and volume. For example, a traditional antenna assembly which operates between 200 MHz and 400 MHZ may have a size of 18 inches long by 18 inches wide by 14-18 inches height may be reduced to approximately 18 inches long by 18 inches wide by 2 inches height while maintaining the same efficiency and range. The ability to achieve the higher performance of a larger antenna in a greatly reduced volumetric size is advantageous.

The top plane 134 of the composite layer 112, as seen in FIGS. 7 and 8, includes the one or more radiating elements 116. The radiating elements 116 function to radiate energy at a resonate frequency. In the examples shown in FIGS. 7 and 8, the radiating elements 116 are configured as dipoles. The one or more radiating elements 116 are connected to the output microstrips 120 by planar transmission lines 138, connecting the one or more radiating elements 116 with the 0/90 hybrid splitter 124 on the base layer 108. The radiating elements 116 may be arranged to work in conjunction with the 0/90 hybrid splitter 124 to produce a right hand circularly-polarized (RHCP) configuration. The output microstrips 120 are fed with a 90-degree phase shift signal form the hybrid splitter 124 to convert from radiating linear polarization to RHCP polarization.

Figure 10:
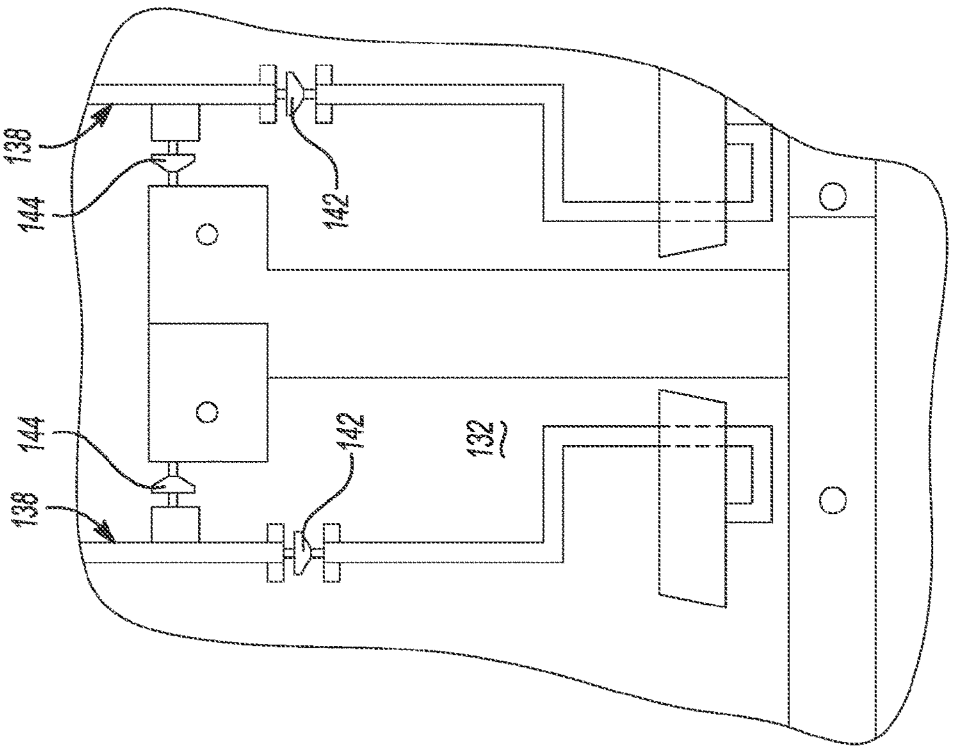
FIG. 10 illustrates an enhanced view of a portion of the strip line including capacitors and inductors.
Figure 9:
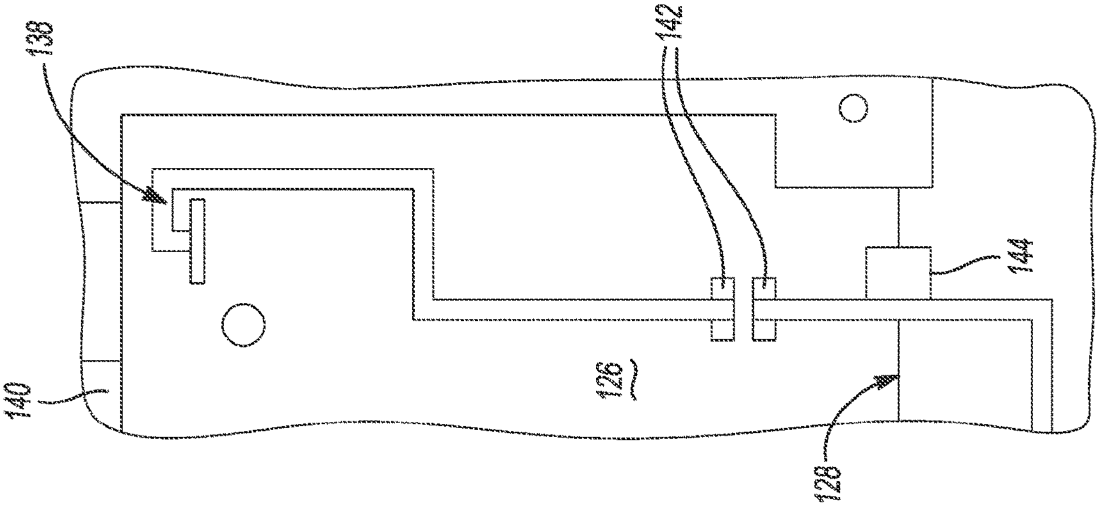
FIG. 9 is an enhanced view of a portion of the strip line including capacitors and inductors.
Figure 11:
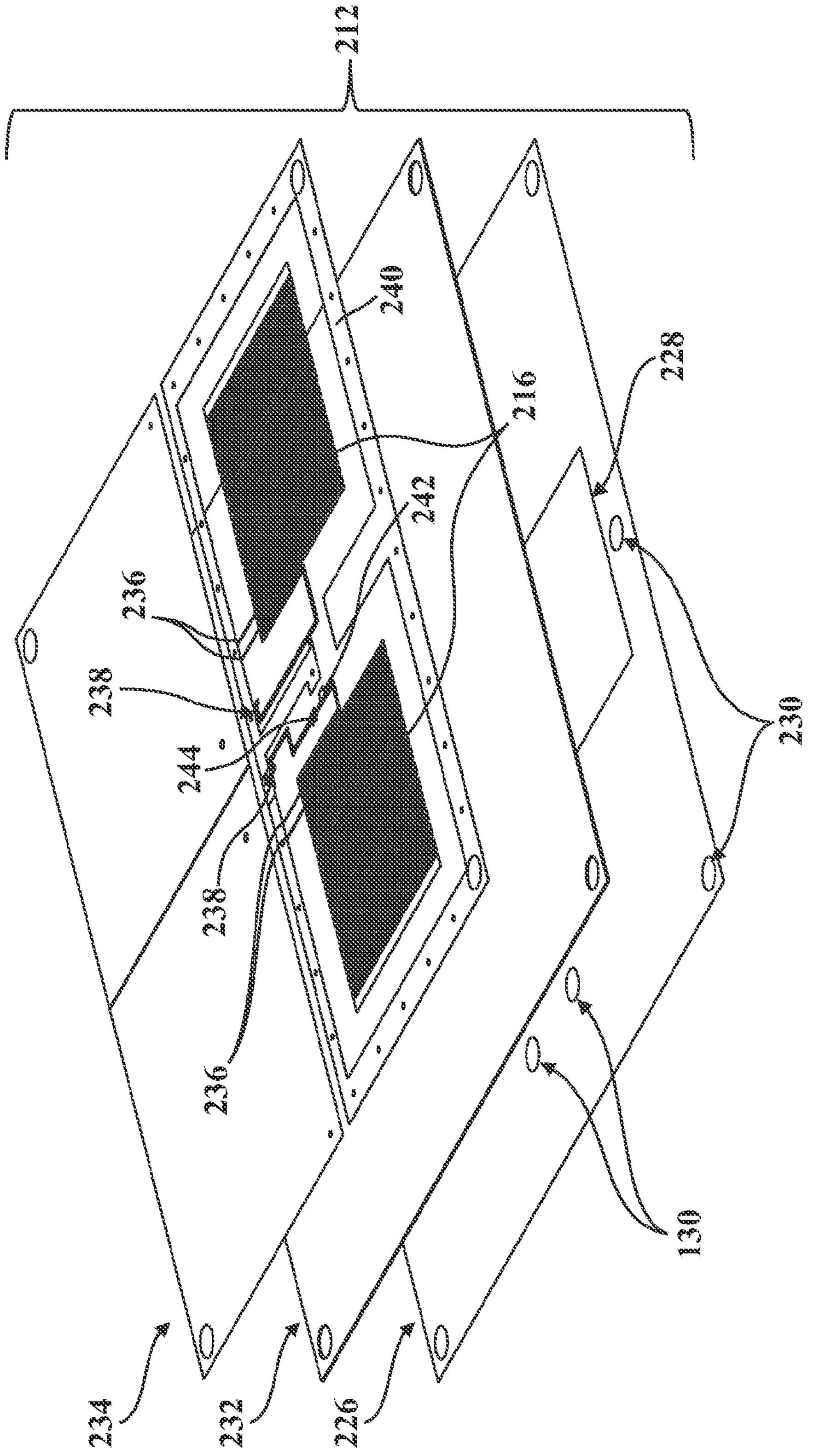
FIG. 11 is a top perspective exploded view of another example of a composite layer.
Figure 12:
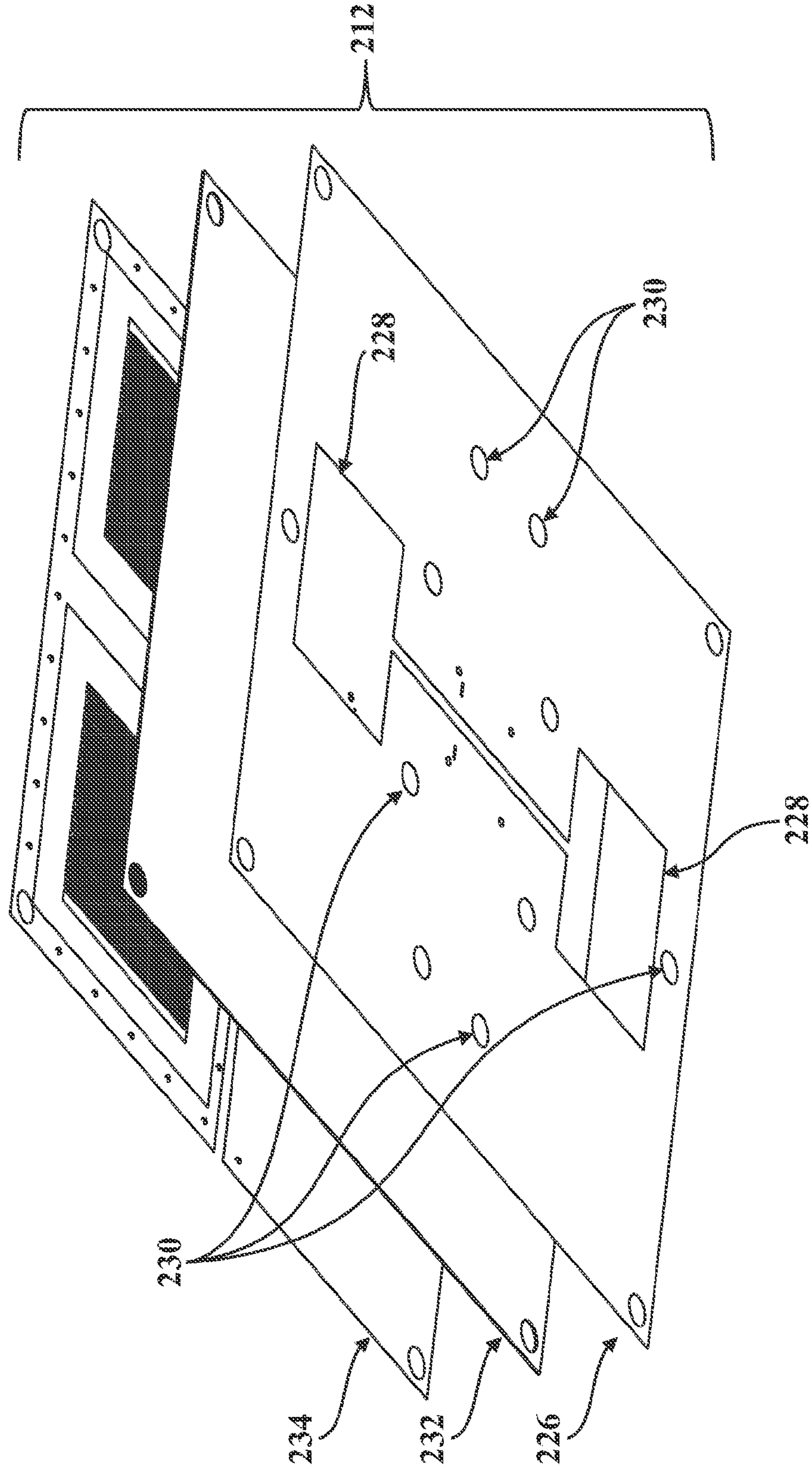
FIG. 12 is a bottom perspective exploded view of the composite layer of FIG. 11.

Further, as seen in FIGS. 9-10, the addition of the capacitors 144 and inductors 142 on each planar transmission line 138 provide for impedance transformation. Particularly, each radiating element 116 includes two capacitors 144 and two inductors 142 on each of the planar transmission lines 138 connecting to the radiating elements 116, forming a 4:1 impedance transformer. In some examples, if only one radiating element 116 is present, a coupler, instead of an impedance transformer, would be implemented.

Traditional techniques incur the Bode-Fano limit that restrict the maximum bandwidth over which matching from one impedance to another impedance is possible when the ratio of impedances becomes large. In the present teachings, this Bode-Fano limit still applies, but is greatly lessened, compared with conventional lumped element capacitors impedance transformation arrayed in a variety of configurations of L-C, C-L, C-L-C, and L-C-L impedance circuits.

Both high-pass and low-pass filter structures can be used to effect an impedance transformation. Similarly, Pi-Network (with components arrayed like the Greek Letter "Pi") and L-Network (with the components arrayed in a L-shape) may be used to implement impedance matching functionality. This technique competes well with the higher impedance transformation ratios achievable with the Pi-Network, in terms of impedance ratios over which becomes possible to match, while improving the bandwidth over which the same desired impedance transformation is achieved.

By incorporating the select capacitors 144 and inductors 142 disposed on the planar transmission line (also known as a feedline) 138, with the DBG 128 and PBG 130 in the ground plane 126, the composite layer acts as a miniaturized broadband transformer for effecting the transformation of high impedances of a miniaturized antenna into a much lower impedances, versus frequency, becomes significantly easier to couple RF power.

The presence of the anisotropic magneto-dielectric material, coupled with the DBG 128/PBG 130 structure, combines to enable a reduction in the size of the radiating elements 116 while maintaining a desired performance in terms of implementation into a smaller physical volume, and a smaller physical area. The antenna assembly simultaneously provides useful operation over a wider bandwidth, which achieves an improvement in the radiation efficiency of a small antenna. The end result is a miniaturized antenna that performs much like a traditional antenna that would occupy a much larger footprint and volume. For example, a traditional antenna assembly which operates between 200 MHz and 400 MHZ may have a size of 18 inches long by 18 inches wide by 14-18 inches tall may be reduced to approximately 18 inches long by 18 inches wide by 2 inches tall while maintaining the same efficiency and range. The ability of the present disclosure to achieve the higher performance of a conventional larger antenna but with a greatly reduced volumetric size is advantageous.

The top plane 134 of the composite layer 112, as best seen in FIG. 8 includes the one or more radiating elements 116. The radiating elements 116 function to radiate energy at a resonate frequency. In the examples shown in 1-8, the radiating elements 116 are configured as dipoles. In some examples, the one or more radiating elements 116 are formed as two-dimensional slow-wave meander lines (described further below). The one or more radiating elements 116 are connected to the output microstrips 120, connecting the one or more radiating elements 116 with the 0/90 hybrid splitter 124 on the base layer 108. In some examples, the radiating elements are arranged as slow-wave stepped meander lines 216, 316, 317 in conjunction with the 0/90 hybrid splitter 124, to produce a right hand circular-polarization (RHCP) configuration. The output microstrips 220 are fed with a 90-degree phase shift signal from the hybrid splitter 124 to convert from radiating linear polarization to RHCP polarization.

Moving on to FIGS. 11-20, the same elements described above with respect to FIGS. 1-10 are further described below in additional examples. The elements described above are similar to the elements described in the following examples in that the antenna assemblies 100, 200, 300 have the same basic components and arranged in the same stacked configuration 106, 206, 306 utilizing a base layer 108, 208, 308, a substrate layer 110, 210, 310, and a composite layer 112, 212. 312. The general features and advantages described above with respect to FIGS. 1-10 are incorporated with respect to FIGS. 11-20.

FIGS. 11-15 display one example of a slow-wave meander line radiating element 216. The slow-wave meander line radiating elements 216 forming the two ends of the dipoles are used for extending the operating bandwidth of the antenna assembly 100. Each of the meander line radiating elements 216 form steps 290 which define the back and forth shape of the elongated sections of the output line 238. Each step includes a first elongated member 276 and a second elongated member 278 connected by a transition section an outer edge 277 of the first elongated member 276 and the second elongated member 278. Each of the elongated members are arranged in a back and forth meandering strip forming the steps 290 of the slow-wave meander line radiating element 216. Each of the elongated members 276, 277 are arranged to cancel the radiated powers of each other, allowing for the outer edges of the radiating elements 216 to combine the radiating powers of the steps 290 in-phase in order to provide the maximum usable radiating energy from the entirety of an individual radiating element 216.

Further, as seen in FIGS. 11-15, the addition of interdigital ground strips 236 in conjunction with the capacitors 244 and inductors 242 on each planar transmission line 238 provide for impedance transformation. Each radiating element 216 includes capacitors 244 and inductors 242 on each of the planar transmission lines 238 connecting to the radiating elements 216 forming a 4:1 impedance transformer. The ground strips 236 are inserted into each of the two-dimensional (2D) radiating elements 116 comprising the two ends of the miniature dipole structure provide a 4:1 power transform. Although only two interdigital ground strips 236 are shown with relation to each radiating element 216 in FIGS. 11-17, adding more interdigital ground strips 236 into similar meander line radiating elements 216 is contemplated. For example, if a larger ratio of impedances were desired to be matched, additional interdigital ground strips 236 may be added between the radiating elements 216. This would allow achieving impedance transformations over even wider ratios of impedances than 4:1. The achievable ratios correspond to 2N:1. Both sides of the meander transmission line 236 are located near ground strips 236 located inside the open section of steps 290 formed by the transmission line 238. In some examples, if only one radiating element 216 is present, a coupler, instead of an impedance transformer, would be implemented.

Figure 15:
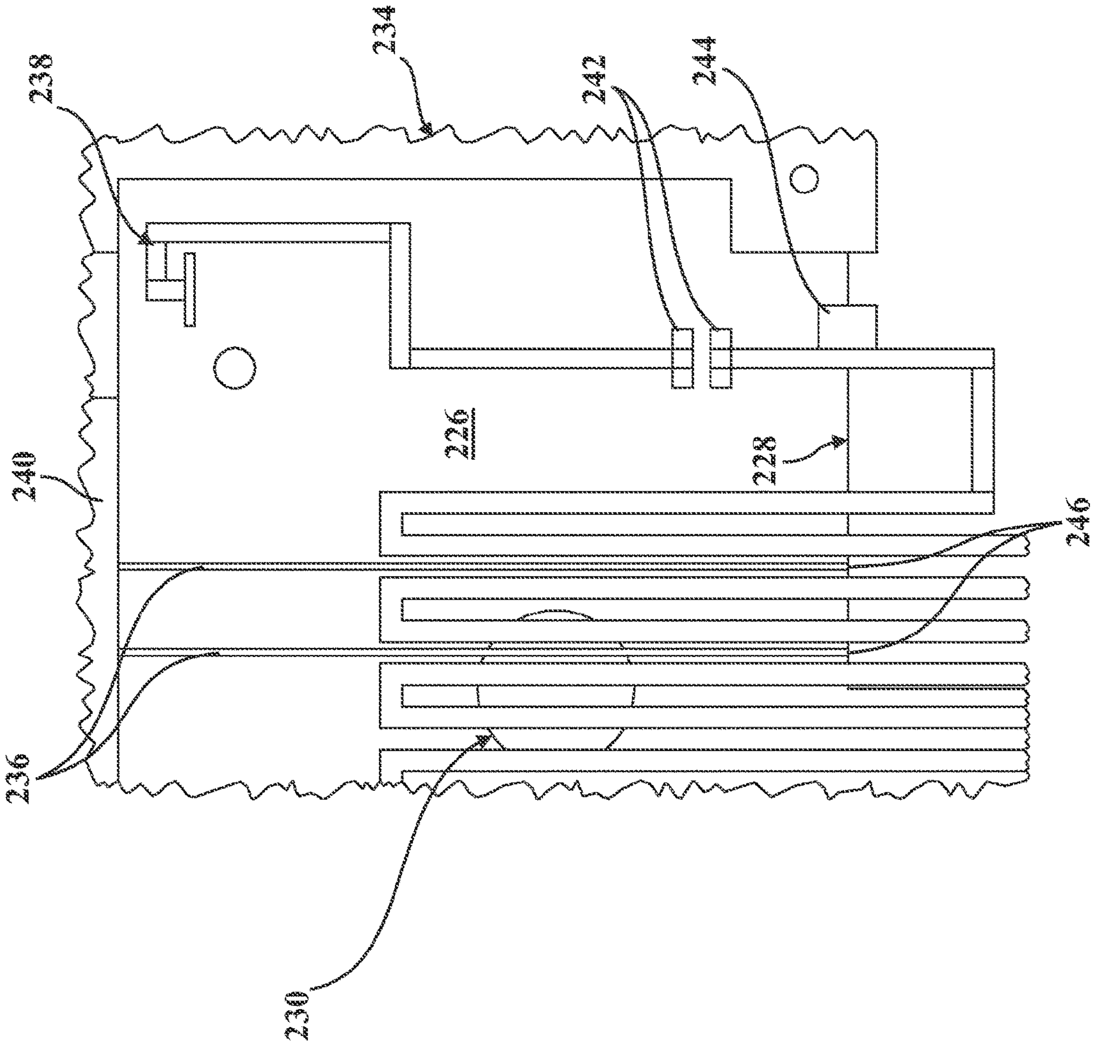
FIG. 15 is an enlarged schematic view of a portion of FIG. 11.
Figure 16:
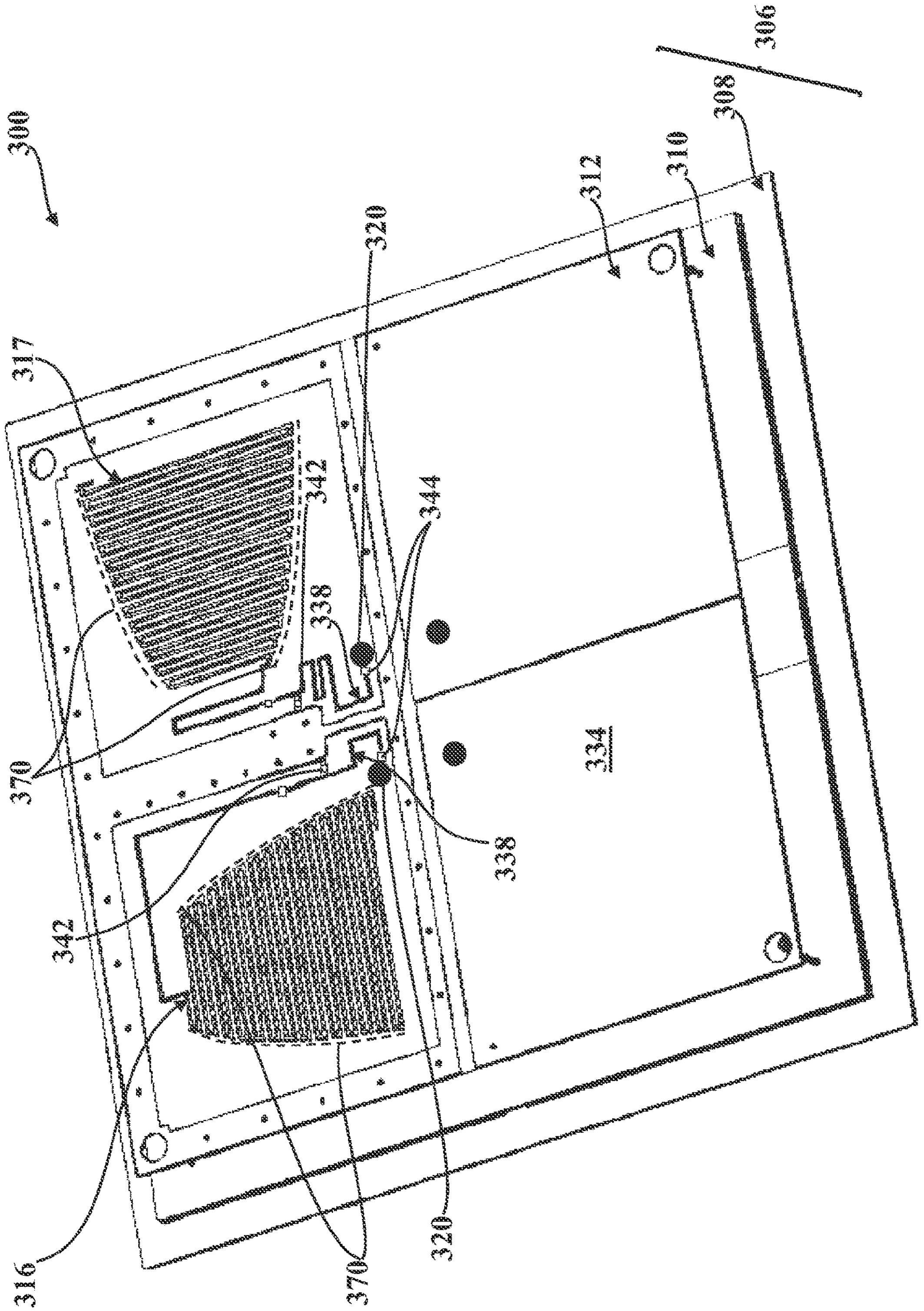
FIG. 16 is another example of a radiating element on the top surface of the composite layer.
Figure 17:
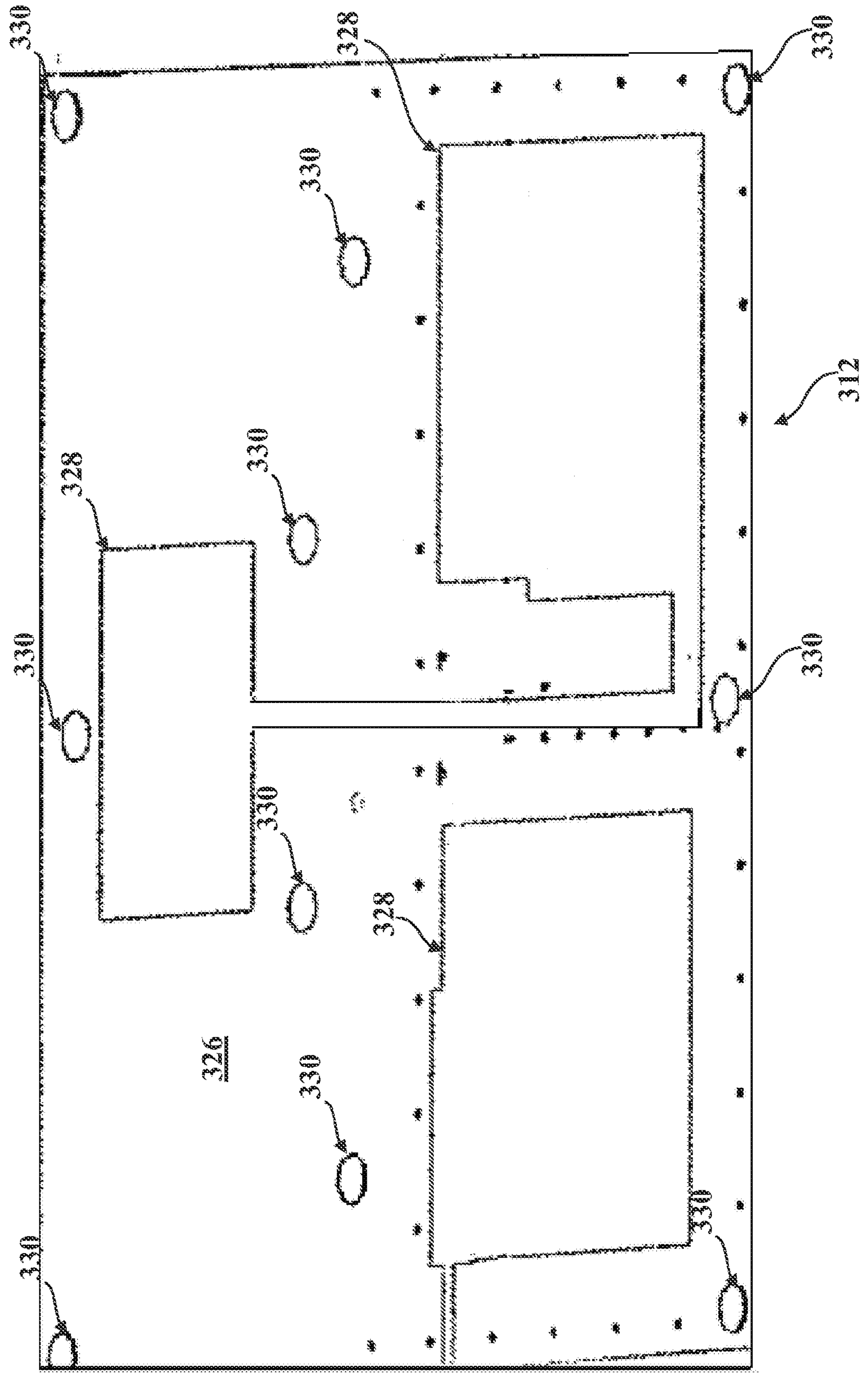
FIG. 17 is a perspective view of the bottom surface of the composite layer.
Figure 18:
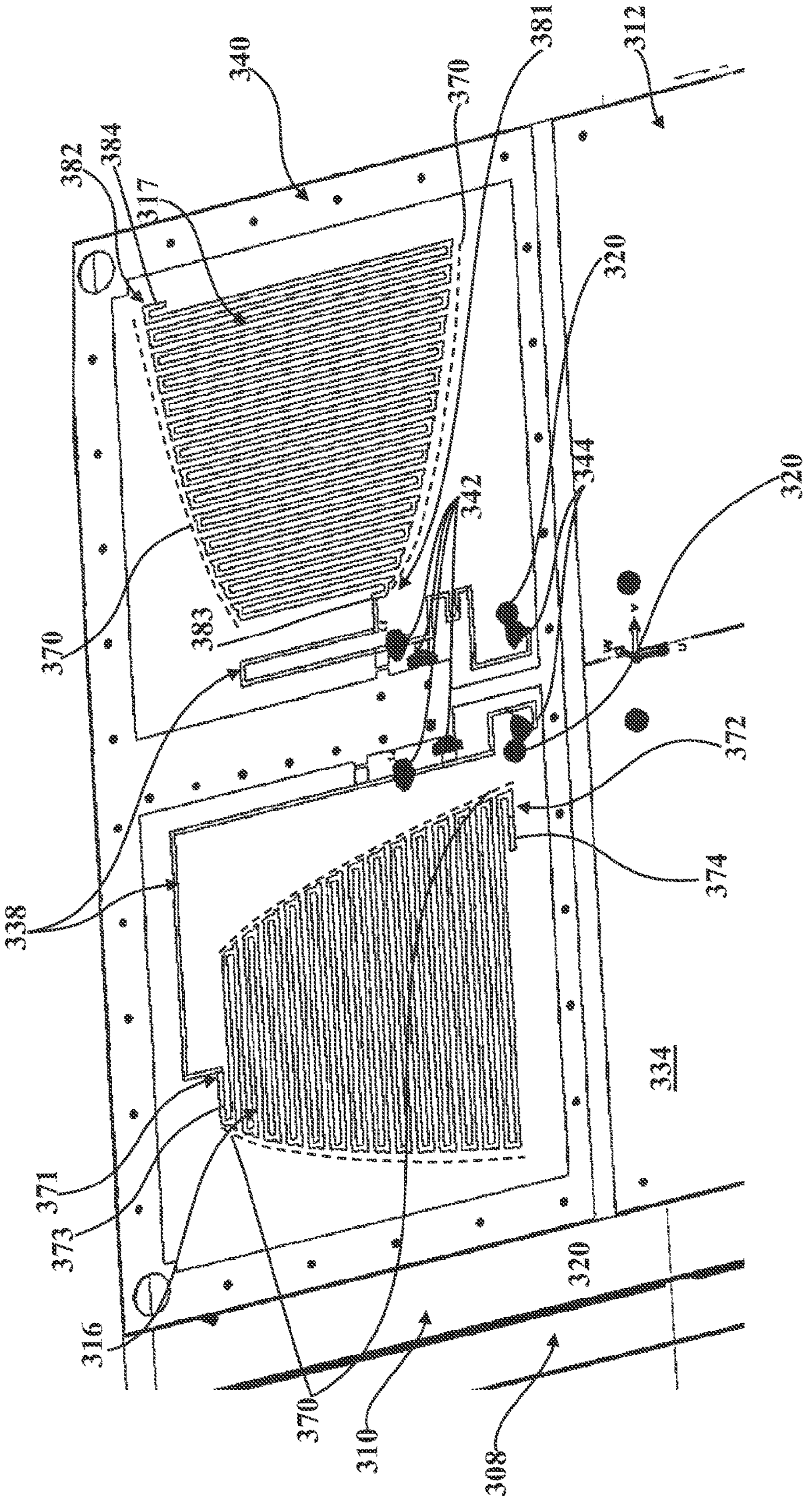
FIG. 18 is an enhanced view showing a portion of the top surface of the composite layer.

FIGS. 15 and 16 illustrate the stepped meander line radiating elements 216 with interdigital ground strips 236, extending from a ground ring 240 around the radiating elements 216 which effects an impedance transformation for a 2-dimensional radiating structure, transforming the high impedance of the miniature antenna assembly to a lower and more readily matched to impedance. Traditional techniques incur the Bode-Fano limit that restrict the maximum bandwidth over which matching from one impedance to another impedance is possible when the ratio of impedances becomes large. In the present teachings, this Bode-Fano limit still applies, but is greatly lessened, compared with conventional lumped element capacitors impedance transformation arrayed in a variety of configurations of L-C, C-L, C-L-C, and L-C-L impedance circuits.

Both high-pass and low-pass filter structures can be used to affect an impedance transformation. Similarly, Pi-Network (with components arrayed like the Greek Letter "Pi") and L-Network (with the components arrayed in a L-shape) may be used to implement impedance matching functionality. This technique competes well with the higher impedance transformation ratios achievable with the Pi-Network, in terms of impedance ratios over which it becomes possible to match, while improving the bandwidth over which the same desired impedance transformation is achieved.

Figure 13:
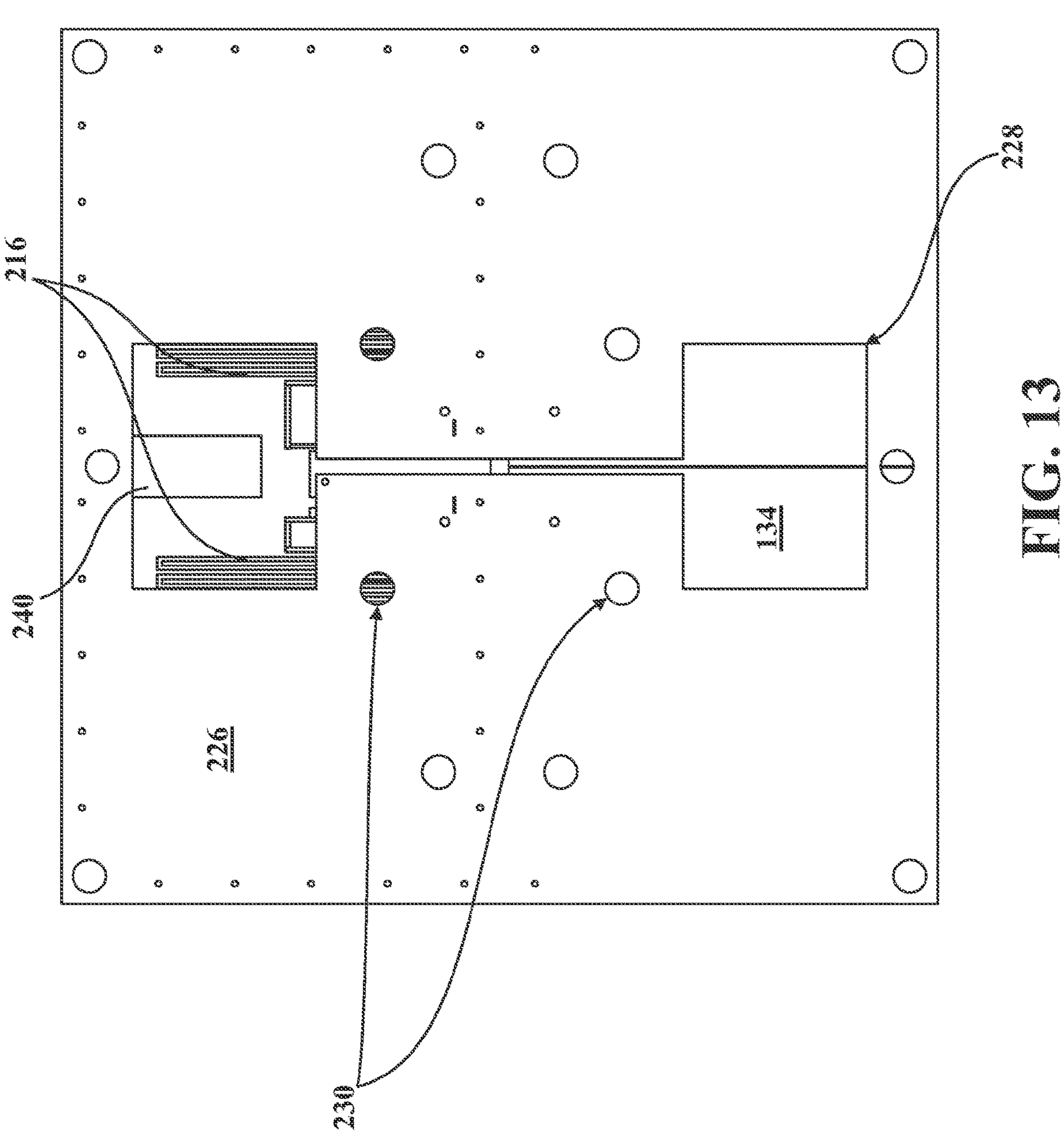
FIG. 13 is a bottom view of the composite layer with the intermediate material hidden.
Figure 14:
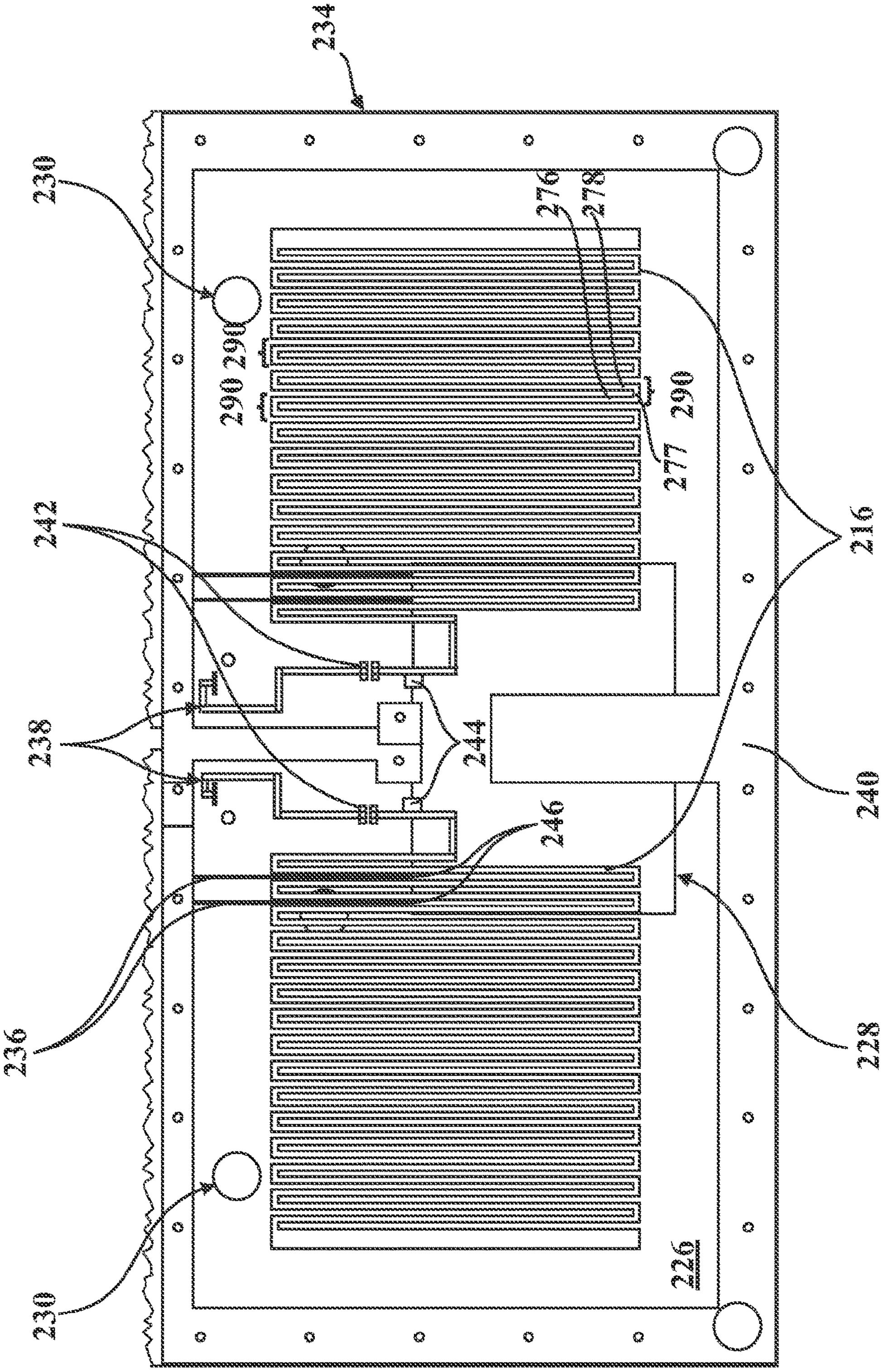
FIG. 14 illustrates the radiating elements on the top surface of composite layer.

The interdigital ground strips 236 is arranged such that each ground strip 236 is inserted into the 2-D meander line structure of the radiating elements 216 and only extends to the edge 246 of the DBG 228 aperture in the bottom ground plane 226. Put another way, each ground strip 236 extends from the ground ring 240 on the top plane 234, between the first two channels of the meander line facing the proximal end of the ground ring 240, stopping at the edge 246 of the material of the ground plane 226 as to not extend into the DBG aperture 228. FIGS. 13-15 have the intermediate material 232 between the top 234 and bottom 226 planes made transparent, thereby showing the alignment of the interdigital ground line 236 interspersed into the 2-Dimensional meander line radiating element 216 with one end of the DBG dumbbell 228 shape below. The plurality of PBG 230 and the end of the dumbbell DBG 228, along which its edge 246 becomes the extent of the interspersed interdigital ground strip 236. By incorporating the meander line with the interdigital ground strips 236, along with the select capacitors 244 and inductors 242 disposed on the feedline 238, and the DBG 228 and PBG 230 in the ground plane 226, a miniaturized broadband transformer for effecting the transformation of high impedances of a miniaturized antenna into a much lower impedances, versus frequency, becomes significantly easier to couple RF power.

Turning to FIGS. 16-20, another example of a stepped meander radiating element 316, 317 is shown. In this example, the features of the stepped meander line elements 316, 317 build on the features of the stepped meander line elements 216 described above to provide further efficiency over the operational frequency band. The slow-wave stepped meander line 316, 317 is shown with an exponential parametric shape 370 in this example. The bottom ground plane 326 is similar to other examples described above 126, 226 incorporating the defected bandgaps (DBG) 328 and photonic bandgaps (PBG) 330. However, due to the exponentially parametric shape radiating elements 316, 317, the DBG 328 has a different shape to accommodate the changes to the radiating elements 316, 317. The slow-wave stepped meander line radiating elements 316, 317 are shaped to increase the efficiency of the antenna with an exponential parametric equation defining the shape on two longitudinal sides of the two-dimensional (2-D) structure.

Similar to the example described with respect to FIGS. 11-15, the radiating elements 316, 317 are slow-wave stepped meander lines formed from the transmission line 338, however, in this example, the radiating elements 316, 317 further include an exponential parametric shape 370. Each step 390 of the radiating elements 316 includes a first elongated member 376 and a second elongated member 378 connected with a transition segment 378 along one of the outer edges 396, 398 of the first elongated member 376 and the second elongated member 378. On the other side of the step 390, the elongated members 376, 378 are left open, forming the continuous zig-zag shape of the stepped meander line radiating elements 316, 317. In this example, the elongated sections 376, 378 have varying lengths as the transmission line 338 extends between a first location 371, 381 and a second location 372, 382 along the top plane 334. These varying lengths of the elongated members 376, 378 are arranged with a taper forming the exponential parametric shape 370 of the radiating elements 316, 317.

The slow-wave stepped meander transmission line 338 of the radiating elements 316, 317 are shaped with the equation $V(t)=s\cdot e^{rt}$, where s is the offset at the origin, r is the rate of taper, and t is the parametric variable. In this equation, $U(t)=t$ and $U(t)=-t$, which is used for both sides to shape the radiating elements 316, 317 with a working local coordinate system (WCS) origin being placed at the center of the two radiating elements 316, 317. The U is the parametric version of x, and V is the parametric version of y. These two analytical exponential curves are built into the model, connected with lines, forming a closed polygon that is 2-D. The 2-D polygon closed curve is then extruded to the same thickness as 1 oz. copper, and Boolean operations are used to combine this shape with the pre-existing shape, so as to shape the whole meander line slow-wave elements 316, 317 to the desired exponential envelope shape 370. The result is that the radiating element 316. 317 is shaped to have exponential function edges 396, 398 having a 2-D shape that expands the operational bandwidth.

The transition segment 377 in this example is further shaped with a notch 379 extending proximally from the first elongated 376 member towards the second elongated member 378. The notched portion 379 of the transition segments 377 provide improved purity of the circular polarization radiation generated by the shape of the radiating elements 316, 317 permitting that only the elongated segments 376, 378 parallel with either the X axis or Y axis are used to connect between the ends of the elongated members 376, 378. The transition segments 377 have short line segments, which are the sole portion of the radiating elements 316, 317 that radiates RF power. As described above, the elongated sections 376, 378 of the meander line cancel each other from transmission. With the elongated sections 376. 378 cancelling one another from radiating, the first radiating element 316 and second radiating element 317 each have stepped transmission lines 338 with a sum total of lengths between the right-hand and left-hand meander lines being the same, meaning that the transmission line 338 of the first radiating element 316 and second radiating element 317 are the same physical length of transmission line 338 extending from the output microstrips 320. Each of the transition segments 377 along the outer two perimeters 396, 398 of the radiating elements 316, 317 are too far apart across the expanse 394 of stepped meander line structure 316, 317 to cancel one another out, precluding the transition segments 377 from cancellation due to spatial separation caused by the phase shift of the radiating energy. No such phase shifts occur between the elongated members 376, 377 of the transmission line 338 that comprise the majority of the radiating elements 316, 317 that are physically close, coupling and cancelling radiation of each the elongated members 376, 378 in the far field.

In addition to the previous innovations involving the magneto-dielectric material to shrink radiating elements sizes, the DBG 328 and PBG 330 high impedance surfaces used in the bottom ground plane 326 as described above, the stepped meander line radiating elements 316, 317 act as an impedance transformer in the upper surface 334 of the composite layer 312 used to transform the high impedances down by a factor of 4.

The bandwidths of the operational frequency of each radiating element 316, 317 are not symmetrical, causing a non-uniform transmission over the 100 MHz to 500 MHz bands. By using parametric equations to shape the edges 396, 398 of the radiating elements 316, 317 an exponential shape 370 results in an increased operational bandwidth of the radiating elements 316, 317. Each step 390 and corresponding transition segment 377 of the stepped meander line radiating elements 316, 317 allow a different frequency over the operational frequency band, creating a "sweet spot" for different frequencies along the shaped edges 396, 398 such that the input impedance of the antenna remains constant, and can be matched to 50 Ohms, and nearly constant radiation largely independent of frequency can be achieved.

By using the exponential parametric shape 370 of the radiating elements 316, 317, creating a logarithmic shape to the radiating elements 316, 317 to provide for frequency independence. Frequency independence may be achieved in the impedance range of each of the radiating elements 316, 317, causing the radiation from the radiating elements 316, 317 to be physically moved in view of the frequency to a cross section inside the meander line radiating elements 316, 317 and now-shaped element where each wavelength finds a corresponding correct-sized portion of the transmission line 338 (e.g., at one of the plurality of transition segments 377) such that the input impedance remains nearly constant relative to frequency, which is a desirable characteristic for a wideband antenna.

Further, the sum total of the length of the first radiating element 316 is the same as the sum total length of the second radiating element 317, in order to generate balanced RHCP (Right Hand Circular Polarized) polarization in place of highly elliptical RHCP polarization, when the elements are positioned in 90 degree physical rotation from one another, while simultaneously being fed radio frequency power phased by 90 degrees electrical phase shift for the power feeding the two inputs of the two antenna elements 320. By offsetting the second radiating element by 90 degrees relative to the first radiating element 316, the antenna generates circular polarization, not elliptical polarization. To generate the desired RHCP polarization, the lengths of the transmission lines 338 of each of the first radiating element 316 and the second radiating element 317 are congruent. Additionally, the total length of the each of the elongated members 376, 378, transition members 377, and each of the steps 390 of the first radiating element 316 is equal to each of the elongated members 376, 378, transition members 377, and each of the steps 390 of the second radiating element 317, continuing along a path from the feed point 320 of the transmission line 338.

Figure 19:
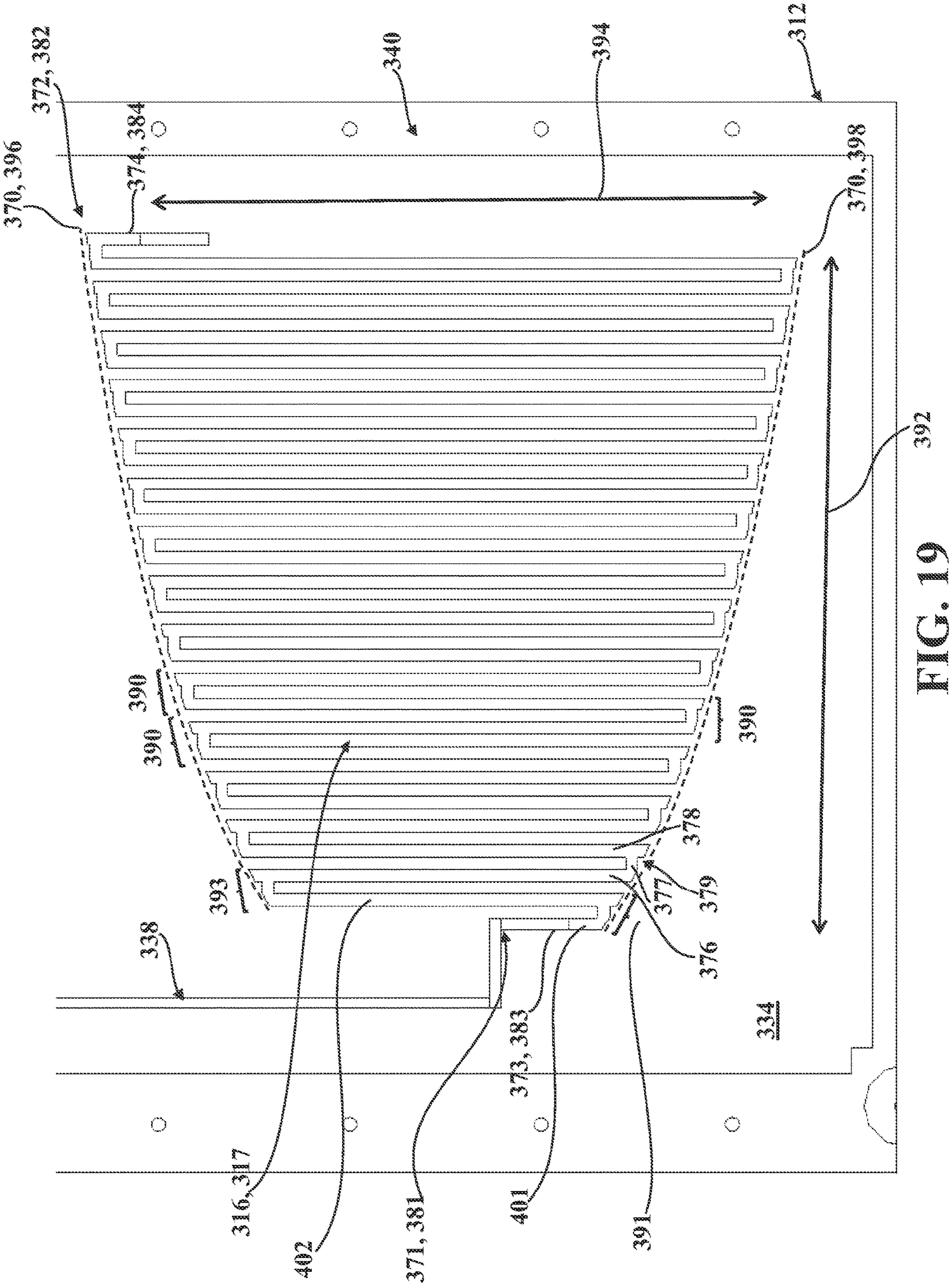
FIG. 19 is an enhanced view of one of the radiating elements with the shaped stepped meander line.
Figure 20:
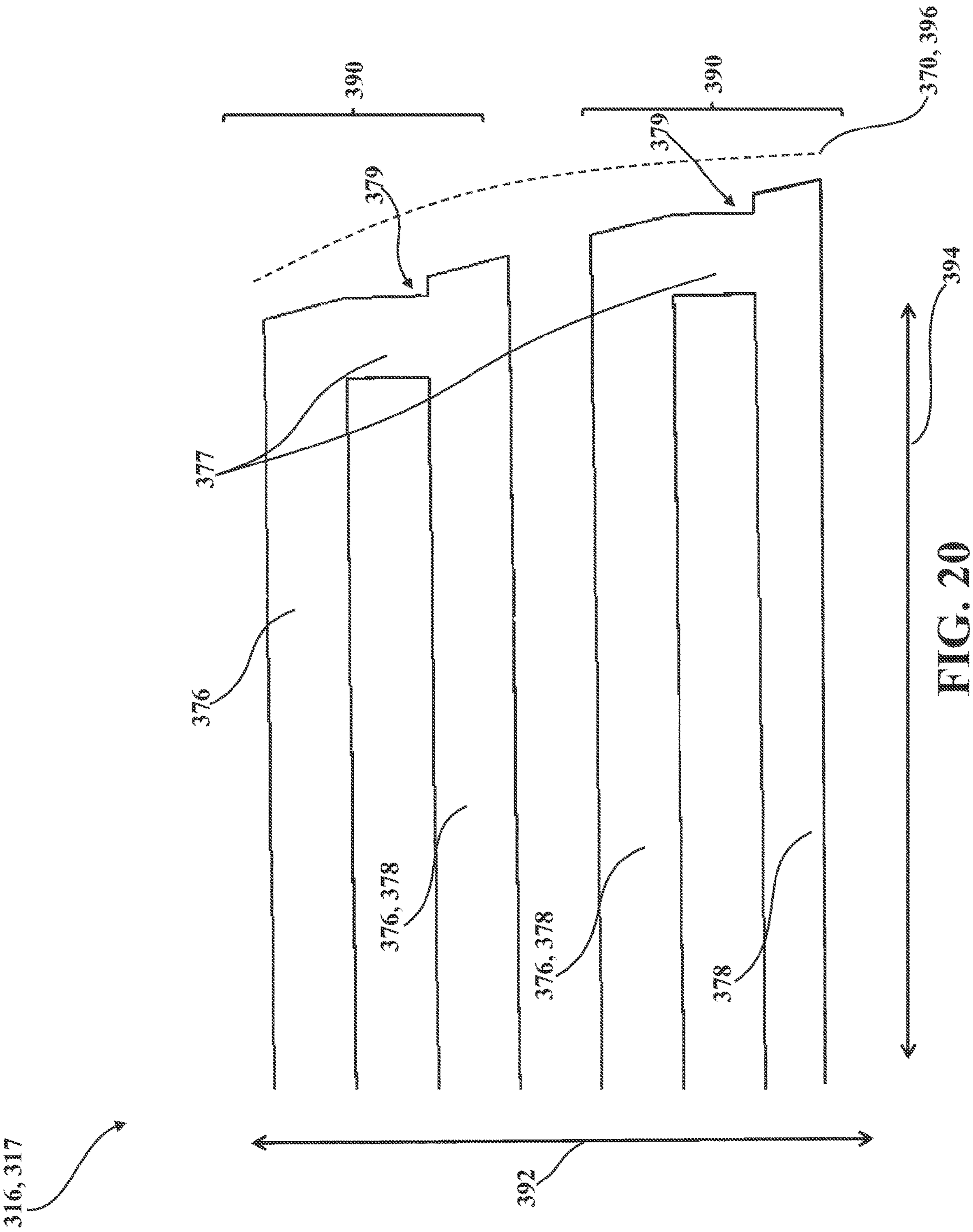
FIG. 20 is an enhanced view showing two steps of the transmission line along one of the outer edges.

As best shown in FIG. 19, each of the radiating elements 316, 317 extend in a longitudinal direction 392 from a first location 371, 381 to a second location 372, 382. The radiating elements 316, 317 start with a partial elongated member 373, 383 extending from the transmission line 338 into the shaped radiating elements 316, 317. Similarly, the same sized partial elongated member 374, 384 is added to the end of the radiating elements 316, 317 to ensure that the sum total of length and the number of back-and-forth transitions between the elongated member 376, 378 remains equal.

Each of the radiating elements 316, 317 have a taper that follows the parametric shape 370. Each elongated member 376, 378 moving along the taper 370 increases the length of expanse 394 (width of each of the elongated members 376, 378) moving in the longitudinal direction 392 between the first location 371, 381 and the second location 372, 382. Each step 390 has a first elongated member 376 with a first length extending to the outer edge 396, 398 of about the transverse direction 394 of the radiating element 316, 317. The first step 391 has an elongated member which is the first meander 401, which, in this example is in a first direction (e.g. to the right) and may also be referred to as a right hand meander. The path then reverses forming the step 391 at edge 398, extending from the outer edge 398 towards edge 396, extending in a second direction, which, in this example is towards the left forming a second meander 402 which forms the second step 393 at edge 396. The left hand meander 402 extends from the edge 396 of the radiating element 316, 317 traversing from the edge 396 to the other edge 398. Adding the subsequent path lengths, whether first step 391 or the second step 393, extending from the outermost edges 396, 398 of the radiating element 316, 317, while going back and forth, progressing from the first location 371, 381 to the second location 373, 383, there are additional right hand meanders and left hand meanders (corresponding to the first elongated member 376 and the second elongated members 378), as one traces a path extending further and further away from the first location 371, 381.

The sum total of all the first meander 401 lengths be made as close as possible to being exactly as long as the sum total of all the second meander lengths, in order to cancel radiation from the parallel meanders in the far field, and preserve RHCP polarization, and thereby prevent generation of LHCP (Left Hand Circular Polarization), and prevent stray vertical or horizontal polarization radiations. This congruence, between the sum total of first meanders 401 and second meanders 402 produces a balanced distributed capacitive and inductive coupling that exists between parallel meanders 401, 402 to provide a slow wave propagation medium in which to provide independent control of bandwidth parameters relative to the parameters in the absence of coupled adjacent meanders. The outermost edges 396, 398 of the radiating element 316, 317, extending along the transition segments 377 that are between adjacent elongated members 376, 377, 401, 402 become the only portion of the radiating elements 316, 317 that are not in close proximity with a parallel portion of the radiating member 316, 317 which would cancel its radiated power, thus allowing the transition segments 377 to radiate uncanceled radiation power. The transition segments 377 being parallel and positioned too far apart to cancel one another produces the characteristic steps 390, 391, 393 at the edges 396, 398 of the radiating element 316. 317. By incorporating the shaped stepped meander line elements 316, 317, along with the select capacitors 344 and inductors 342 disposed on the feedline 338, and the DBG 328 and PBG 330 in the ground plane 326, a miniaturized broadband transformer for effecting the transformation of high impedances of a miniaturized antenna into a much lower impedances, versus frequency, becomes significantly easier to couple RF power.

Similarly, the same technique can apply for implementing radiating elements supporting LHCP (Left Hand Circular Polarized) intended to be phased in terms of the same physical orthogonal, 90-degree, rotations of the radiating elements 316, 317 relative to one another, and simultaneous 90-degree leading in place of lagging electrical phase shifted fed signals, to generate LHCP radiation, for the parallel reversal of the teachings described above for RHCP radiation, when LHCP radiation is desired. These alternate uses of circular polarization are anticipated by the description previously, of an antenna structure intended to be used to produce RHCP supporting antenna elements or LHCP supporting antenna elements, that, depending on the leading or lagging of electrical phases of signals feeding the two elements 316, 317, may produce either RHCP or LHCP radiation. Hence, the provided teachings described above apply to generating both forms of circular polarization, RHCP and LHCP, with the similar radiating elements, by reversing the lagging in view of the leading electrical phasing of the radio frequency power feeding the radiating elements.

Figure 21B:
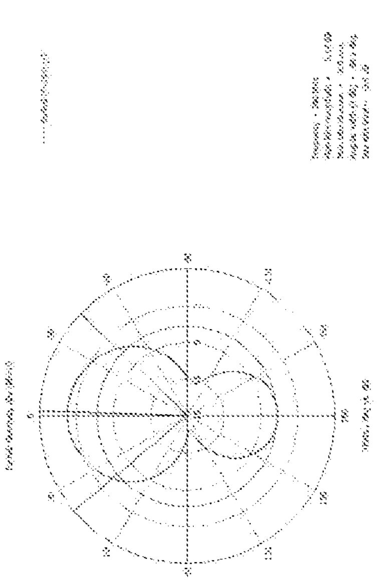
FIG. 21A-21I are example radiating graphs at varying frequencies between 220 MHZ and 380 MHz.
Figure 21D:
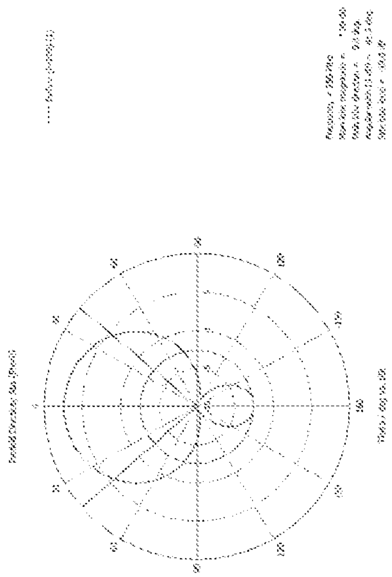
Figure 21A:
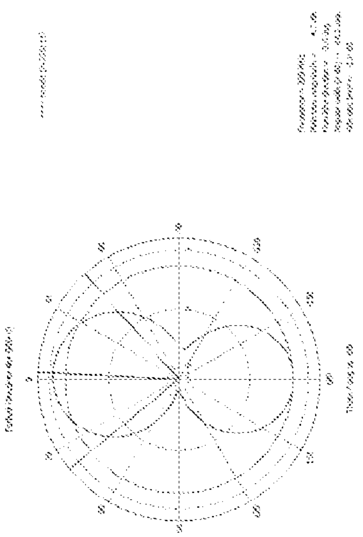
Figure 21C:
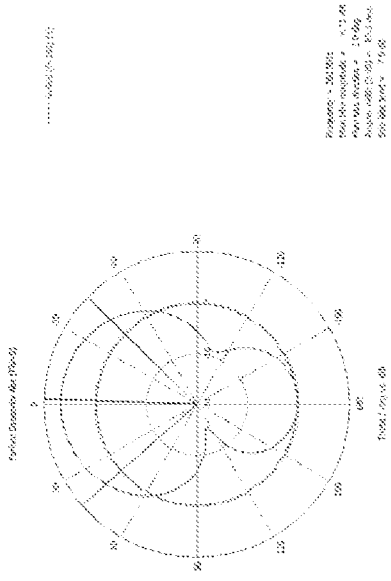
Figure 21E:
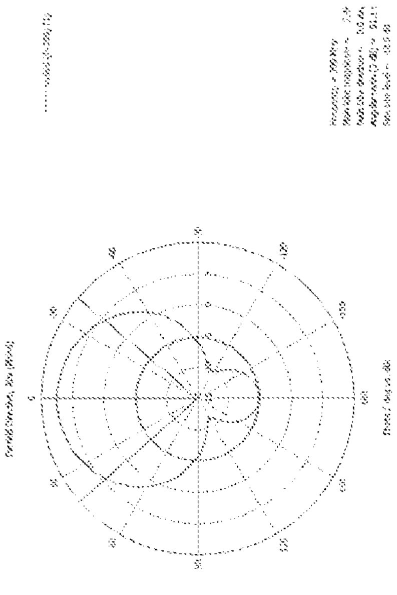
Figure 21F:
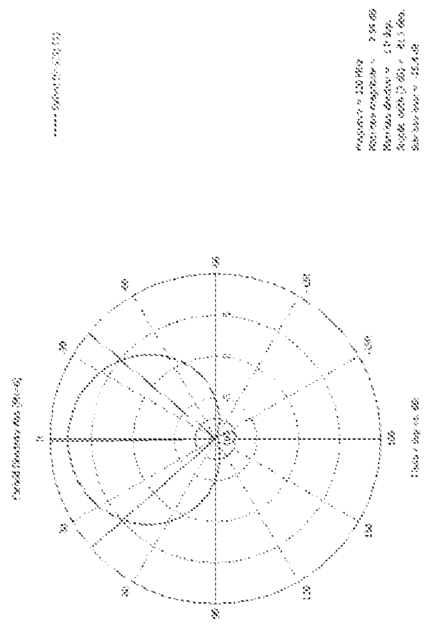
Figure 21G:
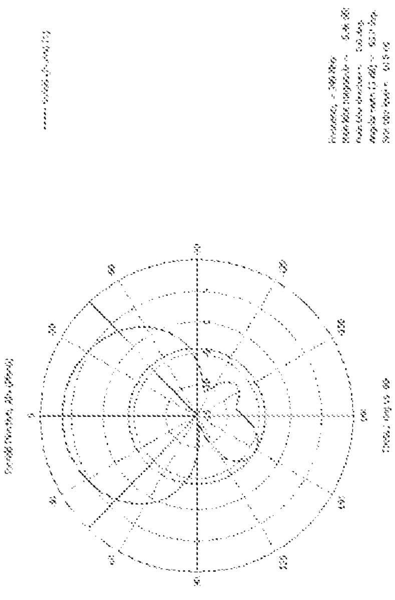
Figure 21H:
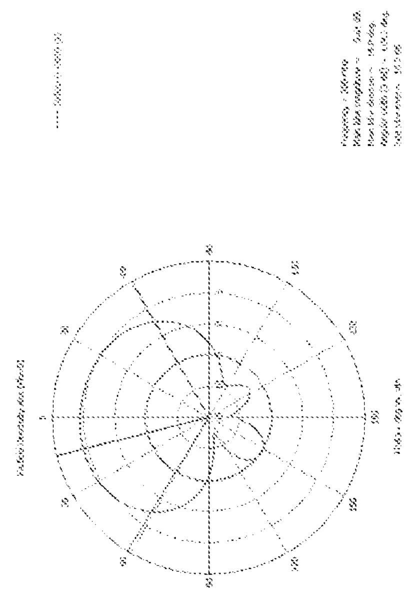
Figure 21I:
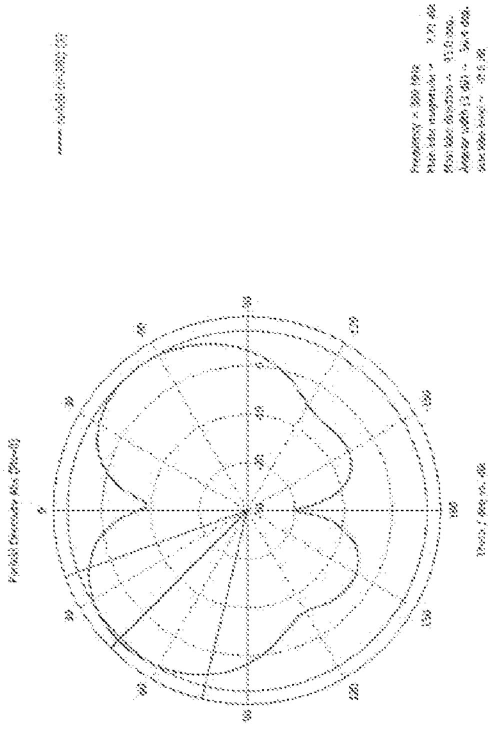

FIGS. 21A-21I each show a radiation graph of a modeled antenna assembly using components similar to the antenna of FIGS. 16-20 at a different frequency between 220 MHz and 380 MHz of the operation frequency band. FIGS. 21A-21I illustrate modeled antennas with electromagnetic performance predictions of directivity for the two shaped stepped meander line radiating elements such as shown with respect to FIGS. 16-20. FIGS. 21A-21I show the flatness of the directivities of the RHCP antenna assembly versus frequency as designed to be used to provide satellite uplink and downlink capabilities, as intended for use with both MUOS and UFO satellite constellations, over 220 MHz to 380 MHz. FIG. 21A shows a radiation graph at 220 MHz with a magnitude of 4.7 dBi. FIG. 21B illustrates a radiation graph at 240 MHz with a magnitude of 6.17 dBi. FIG. 21C illustrates a radiation graph at 260 MHz with a magnitude of 6.73 dBi. FIG. 21D illustrates a radiation graph at 280 MHz with a magnitude of 7.39 dBi. FIG. 21E illustrates a radiation graph at 300 MHz with a magnitude of 7.46 dBi. FIG. 21F illustrates a radiation graph at 320 MHz with a magnitude of 7.84 dBi. FIG. 21G illustrates a radiation graph at 340 MHz with a magnitude of 6.46 dBi. FIG. 21H illustrates a radiation graph at 360 MHz with a magnitude of 5.61 dBi. FIG. 21I illustrates a radiation graph at 380 MHz with a magnitude of 7.72 dBi.

As previously stated, the modeled graph at 380 MHZ (FIG. 21I) is 7.72 dBi, utilizing the shaped stepped meander line radiating element 316, 317 design described above with reference to FIGS. 16-20. The exponential parametric shape 370, provides for improved low-frequency directivity. Further, the exponential parametric shape provides 4.7 dBi at 220 MHz. As seen throughout FIGS. 21A-21I, the radiation models provide for between about 4.5 dBi and 8 dBi which provides for exceptional antenna performance across the sampled 220 MHz to 380 MHz range of the operational frequency band.

Several examples have been discussed in the foregoing description. However, the examples discussed herein are not intended to be exhaustive or limit the teachings to any particular form. The terminology that has been used is intended to be in the nature of words of description rather than of limitation. Many modifications and variations are possible in light of the above teachings and may be practiced otherwise than as specifically described.

What is claimed is:

1. An antenna assembly comprising:

a substrate layer having a first dielectric material that is an anisotropic magneto-dielectric material; and a composite layer spaced apart from the substrate layer, the composite layer including:

a first radiating element and a second radiating element on a top surface of the composite layer, the first radiating element and the second radiating element each include a transmission line folded into a stepped meander line, the stepped meander line extending between a first location and a second location along the top surface;

a ground plane forming a bottom surface of the composite layer;

a second dielectric material between the first and the second radiating element and the ground plane;

wherein the stepped meander line includes a plurality of steps, each of the plurality of steps including a first elongated section and a second elongated section connected by a transition segment, each of the transition segments are arranged on alternating outer edges of the stepped meander line with each of the transition segments being parallel to one another.

2. The antenna assembly of claim 1, wherein the first radiating element and the second radiating element have an exponential parametric shape having a taper between the first location and the second location on the composite layer.

3. The antenna assembly of claim 2, wherein the outer edges of the stepped meander line have the exponential parametric shape.

4. The antenna assembly of claim 3, wherein each transition segment includes a notch between each of the elongated sections, wherein each of the first elongated section and each of the second elongated section have a first end and a second end, the first end and the second end have an angled profile corresponding to the exponential parametric shape, the notch of the transition segments proximally extending in from first elongated section toward the second elongated section while the angled profile of first elongated section and the second elongated section remain parallel.

5. The antenna assembly of claim 4, wherein the elongated sections each have a self-resonance frequency which cancels a radiated transmission of each corresponding elongated section, and wherein each of the transition segments radiate energy parallel along the parametric shape.

6. The antenna assembly of claim 5, wherein the transmission line of the first radiating element has an equal length to the transmission line of the second radiating element, and wherein the first radiating element is congruent with the second radiating element.

7. The antenna assembly of claim 2, wherein the bottom surface of the composite layer defines a plurality of bandgaps, the plurality of bandgaps defined by the ground plane, the ground plane including at least one first bandgap and at least one second bandgap, wherein the at least one first bandgap inhibits circulating ground currents at a first frequency range, and the at least one second bandgap inhibits circulating ground currents at a second frequency range.

8. The antenna assembly of claim 7, wherein the at least one first bandgap and the at least one second bandgap form a high impedance structure in the ground plane throughout an operational frequency band, causing the ground plane to be a frequency selective surface, reducing loss of radiation by decreasing circulating ground currents at the first frequency range and the second frequency range.

9. The antenna assembly of claim 8, wherein the first frequency range overlaps with the second frequency range.

10. The antenna assembly of claim 8, wherein exponential parametric taper of the first radiating element and the second radiating element reduce transmission speed of energy while widening the operational frequency band working in conjunction with the at least one first bandgap and the at least one second bandgaps to electromagnetically decouple the first radiating element and the second radiating element with respect to each other throughout the operational frequency band, providing the antenna assembly with a physically small size relative to the operational frequency band.

11. The antenna assembly of claim 7, wherein the first bandgap is a defected bandgap that reduces fall off of the first frequency range by 20 percent to 50 percent; and the second bandgaps is a photonic bandgap configured to reduces fall off of the second frequency range by 20 percent to 50 percent.

12. The antenna assembly of claim 1, wherein the plurality of steps of each of the first radiating element and second radiating element progressively extend in expanse between the first location and the second location on the composite layer, such that the first elongated section has a shorter length than the second elongated section, and the second elongated section has a shorter length than a third elongated section.

13. The antenna assembly of claim 1, wherein the antenna assembly has an operational frequency of 100-500 MHZ.

14. The antenna assembly of claim 1, wherein the substrate layer is spaced apart from the ground plane by a distance.

15. The antenna assembly of claim 1, wherein the first radiating element and the second radiating element are arranged on the composite layer such that the second radiating element is orthogonal to the first radiating element forming an electrical phase shift of 90 degrees, increasing circular polarization.

16. An antenna assembly with an operational frequency band between 100 MHz and 500 Mhz, the antenna assembly comprising:

a base;

a substrate layer disposed on the base, the substrate layer having an anisotropic magneto-dielectric material; and a composite layer spaced apart from the substrate layer, the composite layer including:

two radiating elements on a top surface of the composite layer, each of the radiating elements each include a stepped meander line with an exponential parametric tapered shape;

a ground plane forming a bottom surface of composite layer, the ground plane defining a plurality of bandgaps forming a frequency selective surface;

a dielectric material between the two radiating elements and the ground plane;

wherein exponential parametric taper of the two radiating elements reduce transmission speed of energy while widening an operational frequency band working in conjunction with the plurality of bandgaps to electromagnetically decouple the two radiating elements with respect to each other throughout the operational frequency band, providing the antenna assembly with a physically small size relative to the operational frequency band.

17. The antenna assembly of claim 16, wherein each of the stepped meander lines include a plurality of steps, each of the plurality of steps including a first elongated section and a second elongated section connected by a transition segment, each of the transition segments are arranged on alternating outer edges of the stepped meander line with each of the transition segments being parallel to one another.

18. The antenna assembly of claim 17, wherein the first radiating element and the second radiating element have an exponential parametric shape having a taper along each of the outer edges of the stepped meander line between the first location and the second location on the composite layer.

19. The antenna assembly of claim 18, wherein each transition segment includes a notch between each of the elongated sections, and wherein each of the first elongated sections and each of the second elongated sections have a first end and a second end, the first end and the second end have an angled profile corresponding to the exponential parametric curve, the notch of the transition segments proximally cutting in from first elongated section toward the second elongated section while the angled profile of first elongated section and the second elongated section remain parallel.

20. The antenna assembly of claim 17, wherein the plurality of bandgaps are at least one defected bandgap and at least one photonic bandgap, the plurality of bandgaps decrease magnitudes of circulating ground currents in the ground plane throughout the operational frequency band, increasing energy radiated by the two radiating elements throughout the operational frequency band, the at least one defected bandgap prevents circulating ground currents at a first frequency range, and the at least one photonic bandgap prevents circulating ground currents at a second frequency range making the ground plane a high impedance structure and a frequency selective surface.

* * * * *